US011533623B2

(12) United States Patent
Agarwal et al.

(10) Patent No.: US 11,533,623 B2
(45) Date of Patent: Dec. 20, 2022

(54) DETECTION OF FALSE BASE STATIONS BASED ON SIGNAL TIMES OF ARRIVAL

(71) Applicant: QUALCOMM Incorporated, San Diego, CA (US)

(72) Inventors: Ravi Agarwal, San Diego, CA (US); Gavin Bernard Horn, La Jolla, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/086,240

(22) Filed: Oct. 30, 2020

(65) Prior Publication Data

US 2021/0153023 A1 May 20, 2021

Related U.S. Application Data

(60) Provisional application No. 62/935,601, filed on Nov. 14, 2019.

(51) Int. Cl.
*G06F 21/00* (2013.01)
*H04W 12/122* (2021.01)
(Continued)

(52) U.S. Cl.
CPC ......... *H04W 12/122* (2021.01); *H04L 5/0051* (2013.01); *H04W 12/61* (2021.01);
(Continued)

(58) Field of Classification Search
None
See application file for complete search history.

(56) References Cited

U.S. PATENT DOCUMENTS 7,409,557 B2 * 8/2008 Teppler ............... H04L 9/3297
713/178
8,351,900 B2 1/2013 Lotvonen et al.
(Continued)

OTHER PUBLICATIONS

Nokia: "Solution for Key Issue#3: Network Detection of Near by Fake Base Stations", S3-190660 revision of S3-19xabc, 3GPP TSG-SA WG3 Meeting #94Ad-Hoc, Stockholm (Sweden), Mar. 11-15, 2019, 3 Pages.
(Continued)

*Primary Examiner* — Maung T Lwin
(74) *Attorney, Agent, or Firm* — Qualcomm Incorporated

(57) ABSTRACT

Apparatus, methods, and computer-readable media for facilitating detection of false base stations based on signal times of arrival are disclosed herein. An example method for wireless communication of a UE includes receiving a signal from each of one or more neighboring base stations. The example method also includes determining a system timing associated with the wireless communications network based on a respective time of arrival at which each signal is received from the neighboring base stations. The example method also includes receiving a signal from an FBS, the FBS signal being associated with a PCI different than the PCIs associated with the signals received from each of the neighboring base stations. Additionally, the example method includes identifying a presence of the FBS based on a difference between the system timing and a time of arrival at which the signal is received from the FBS.

28 Claims, 10 Drawing Sheets

(51) Int. Cl.
   *H04L 5/00* (2006.01)
   *H04W 56/00* (2009.01)
   *H04W 72/00* (2009.01)
   *H04W 12/61* (2021.01)
   *H04W 12/73* (2021.01)

(52) U.S. Cl.
   CPC ......... *H04W 12/73* (2021.01); *H04W 56/001* (2013.01); *H04W 72/005* (2013.01)

(56) References Cited

U.S. PATENT DOCUMENTS

| | | | | |
|---|---|---|---|---|
| 8,868,497 | B2* | 10/2014 | Yan | H04L 67/1095 707/618 |
| 8,995,370 | B2* | 3/2015 | Pelletier | H04W 88/06 370/328 |
| 9,397,769 | B2* | 7/2016 | Mirbagheri | H04B 17/336 |
| 9,538,493 | B2* | 1/2017 | Dupray | G01S 5/021 |
| 10,129,283 | B1 | 11/2018 | Briggs et al. | |
| 10,200,869 | B2 | 2/2019 | Norrman et al. | |
| 10,986,502 | B1* | 4/2021 | Noonan | H04W 52/283 |
| 2009/0279457 | A1* | 11/2009 | Lucas | H04W 56/00 370/280 |
| 2012/0106528 | A1* | 5/2012 | Estevez | H04W 88/06 370/338 |
| 2015/0230091 | A1* | 8/2015 | Sahu | H04L 63/1441 455/410 |
| 2016/0112974 | A1* | 4/2016 | Shenoi | H04J 3/065 370/350 |
| 2016/0291124 | A1 | 10/2016 | Bauer | |
| 2017/0279701 | A1 | 9/2017 | Ahmadzadeh et al. | |
| 2019/0306720 | A1 | 10/2019 | Nakarmi et al. | |
| 2021/0297965 | A1* | 9/2021 | Irvine | H04W 56/0045 |

OTHER PUBLICATIONS

International Search Report and Written Opinion—PCT/US2020/058596—ISA/EPO—dated Feb. 18, 2021.

* cited by examiner

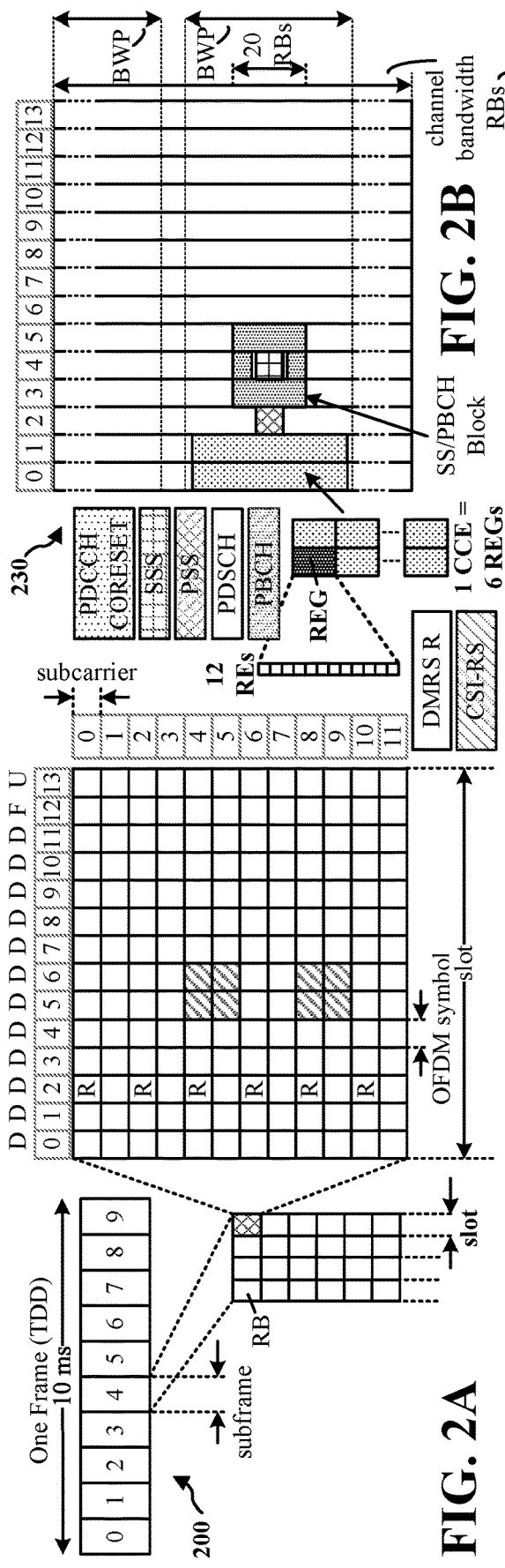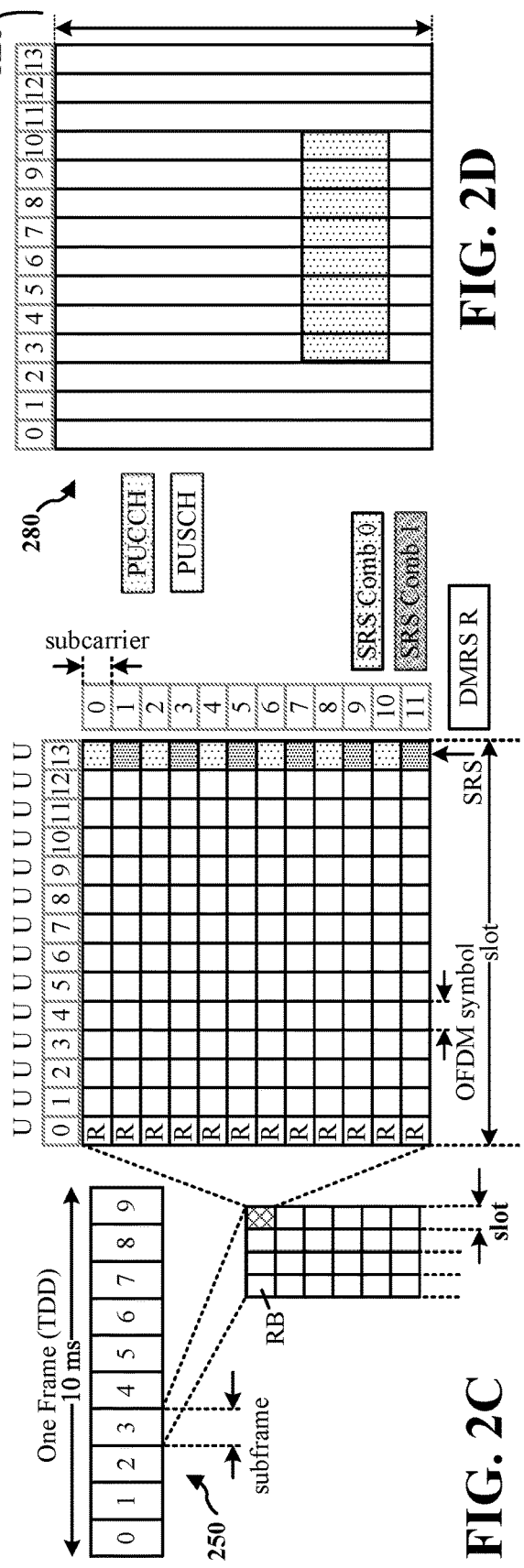

DETECTION OF FALSE BASE STATIONS BASED ON SIGNAL TIMES OF ARRIVAL

CROSS REFERENCE TO RELATED APPLICATION(S)

This application claims the benefit of U.S. Provisional Application Ser. No. 62/935,601, entitled "DETECTION OF FALSE BASE STATIONS BASED ON SIGNAL TIMES OF ARRIVAL," and filed on Nov. 14, 2019, which is expressly incorporated by reference herein in its entirety.

BACKGROUND

Technical Field

The present disclosure relates generally to communication systems, and more particularly, to detection of false base stations based on times of arrival of signals from neighboring cells.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In various wireless communications systems, security for the air interface may be implemented at relatively higher layers of radio protocol stacks. Signaling that originates at relatively lower layers of radio protocol stacks may be unsecured. For example, signaling originating at a physical (PHY) layer of a radio protocol stack may be unprotected, e.g., by not implementing security primitives. Consequently, malicious or otherwise deleterious systems may mimic legitimate lower-layer signals and/or channels (e.g., legitimate PHY signals and/or channels) in order to attack or illicitly access a user equipment (UE).

An example of a malicious system includes a false base station (FBS). For unauthorized communication with a UE, an FBS may transmit synchronization signals to the UE so that the UE will synchronize to the FBS. The FBS may attack the UE once the UE is connected to the FBS and/or camped on a cell operated by the FBS, such as by infecting the UE with malware, stealing confidential information, and so forth.

An FBS may act as one form of a man-in-the-middle (MITM) attacker by residing between a UE and a legitimate base station, thereby effectively bisecting a communications link between the UE and the legitimate base station. In doing so, the FBS may operate as a (potentially) malicious repeater. Both the UE and the legitimate base station may be unaware of the presence of the FBS and, therefore, the UE may recognize the FBS as the legitimate base station while the legitimate base station may recognize the FBS as the UE. A legitimate base station may refer to a base station belonging to a network (e.g., a communication network, such as a cellular network) that a UE is trying to access for service. The FBS, acting as an MITM attacker, may alter or inject unsecure and/or harmful transmissions into the communications link between the UE and the legitimate base station and/or may selectively drop some (secure or unsecure) transmissions from the communications link in one or both directions (e.g., uplink and/or downlink).

In many scenarios, the MITM FBS may use the same physical cell identity (PCI) as the legitimate base station. In particular, because access stratum (AS) security keys are at least partially derived from a PCI of a serving cell, the MITM FBS can use the same PCI in order to remain undetected while relaying unmodified secure signaling messages. For example, absent use of the PCI of the legitimate cell, secure signaling messages relayed by the MITM FBS may fail message integrity checks by the UE.

Such secure signaling messages relayed by the MITM FBS may include control information, which may be carried on a control channel. The MITM FBS may selectively drop some control information, e.g., in order to insert its own control information for processing by the UE. The MITM FBS may selectively drop some control information rather than all control information because preventing the UE from receiving all control information may reveal the MITM attack and/or may lead to cell reselection by the UE away from the cell of the MITM FBS.

In order to selectively drop some secure signaling messages from the legitimate base station to the UE, the MITM FBS needs to decode those secure signaling messages to, for example, determine corresponding actions based on the information in a message and/or to determine whether the message should be relayed without dropping to avoid detection or cell reselection by the UE. However, decoding secure signaling messages intended for the UE from the legitimate base station introduces delay on the communications link between the UE and the legitimate base station. The introduction of such delay may be unexpected by the UE, and detection of the delay may alert the UE to the presence of the MITM FBS. To that end, the present disclosure describes various techniques and approaches to facilitate the detection of the delay introduced by an MITM FBS, as well as to facilitate the detection and avoidance of the MITM FBS causing the delay.

In a first aspect of the disclosure, a first method, a first computer-readable medium, and a first apparatus are provided for wireless communication at a UE. The first apparatus receives a signal from each of one or more neighboring base stations, and each of the received signals may be associated with a different, unique PCI. The first apparatus also determines a system timing associated with the wireless communications network based on a respective time of arrival at which each signal is received from the neighboring base stations. Additionally, the first apparatus receives a signal from an FBS, the signal received from the FBS being associated with a PCI different than the PCIs associated with the signals received from each of the neighboring base stations. The first apparatus also identifies a presence of the FBS based on a difference between the system timing and a time of arrival at which the signal is received from the FBS.

In one aspect, the signal received from the neighboring base stations and the signal received from the FBS each comprise one of a synchronization signal (SS)/broadcast channel block or a reference signal. In one aspect, the first apparatus may further determine the difference between the system timing and the time of arrival at which the signal is received from the FBS, and the presence of the FBS may be identified when the difference satisfies a timing threshold. In one aspect, the timing threshold is received from a legitimate base station via one of a system information block (SIB) or UE-specific signaling.

In one aspect, the first apparatus may further determine the timing threshold. The timing threshold may be based on at least one inter-site distance between at least two neighboring base stations respectively operating the neighboring base stations, the inter-site distance comprising a nominal distance between the at least two neighboring base stations deployed within the wireless communications network. The timing threshold may be equal to at least one symbol duration.

In one aspect, the first apparatus may further determine an average timing based on the times of arrival at which the signals are received from each of the neighboring cells, and the system timing is determined based on the average timing. The average timing may be determined based on weighting powers with which each of the signals is received from the neighboring base stations.

In one aspect, the first apparatus may further apply a mitigation operation associated with avoidance of communication with the FBS when the presence of the FBS is identified. To perform the mitigation operation, the first apparatus may at least one of: report the presence of the FBS to a security server of the wireless communications network, or change one or more communication parameters associated with accessing the wireless communications network. The one or more communication parameters may include at least one of a base station on which the first apparatus operates, a frequency band in which the first apparatus communicates, or a radio access technology (RAT) with which the first apparatus communicates.

In one aspect, any two of the times of arrival at which any two signals are received from at least two neighboring bae stations are within a timing threshold amount of one another. The timing threshold amount may be based on at least one inter-site distance between at least two neighboring base stations respectively operating the one or more neighboring base stations, the inter-site distance comprising a nominal distance between the at least two base stations deployed within the wireless communications network.

In a second aspect of the disclosure, a second method, a second computer-readable medium, and a second apparatus are provided for wireless communication at a base station. The second apparatus determines a timing threshold associated with detection of an FBS by a UE, and the timing threshold may correspond to a maximum acceptable difference between a system timing and a time of arrival at which a signal is received from the FBS by the UE. The second apparatus also transmits the timing threshold to the UE for the detection of the false base station by the UE.

In one aspect, the timing threshold is transmitted via one of a SIB or UE-specific signaling. The timing threshold may be based on at least one inter-site distance between at least two base stations respectively operating one of a set of base stations neighboring the UE. The timing threshold may be equal to at least one symbol duration.

In one aspect, the second apparatus may receive a report of the false base station from the UE based on the timing threshold transmitted to the UE and, further, may apply a mitigation operation in response to the report of the false base station. To apply the mitigation operation, the second apparatus may hand over the UE to a base station different from that operated by the false base station. To apply the mitigation operation, the second apparatus may change one or more communication parameters associated with the UE, and the communication parameters are to cause the UE to deprioritize cell selection or cell reselection of a cell operated by the false base station.

To the accomplishment of the foregoing and related ends, the aspects comprise the features hereinafter fully described and particularly pointed out in the claims. The following description and the annexed drawings set forth in detail certain illustrative features of the aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
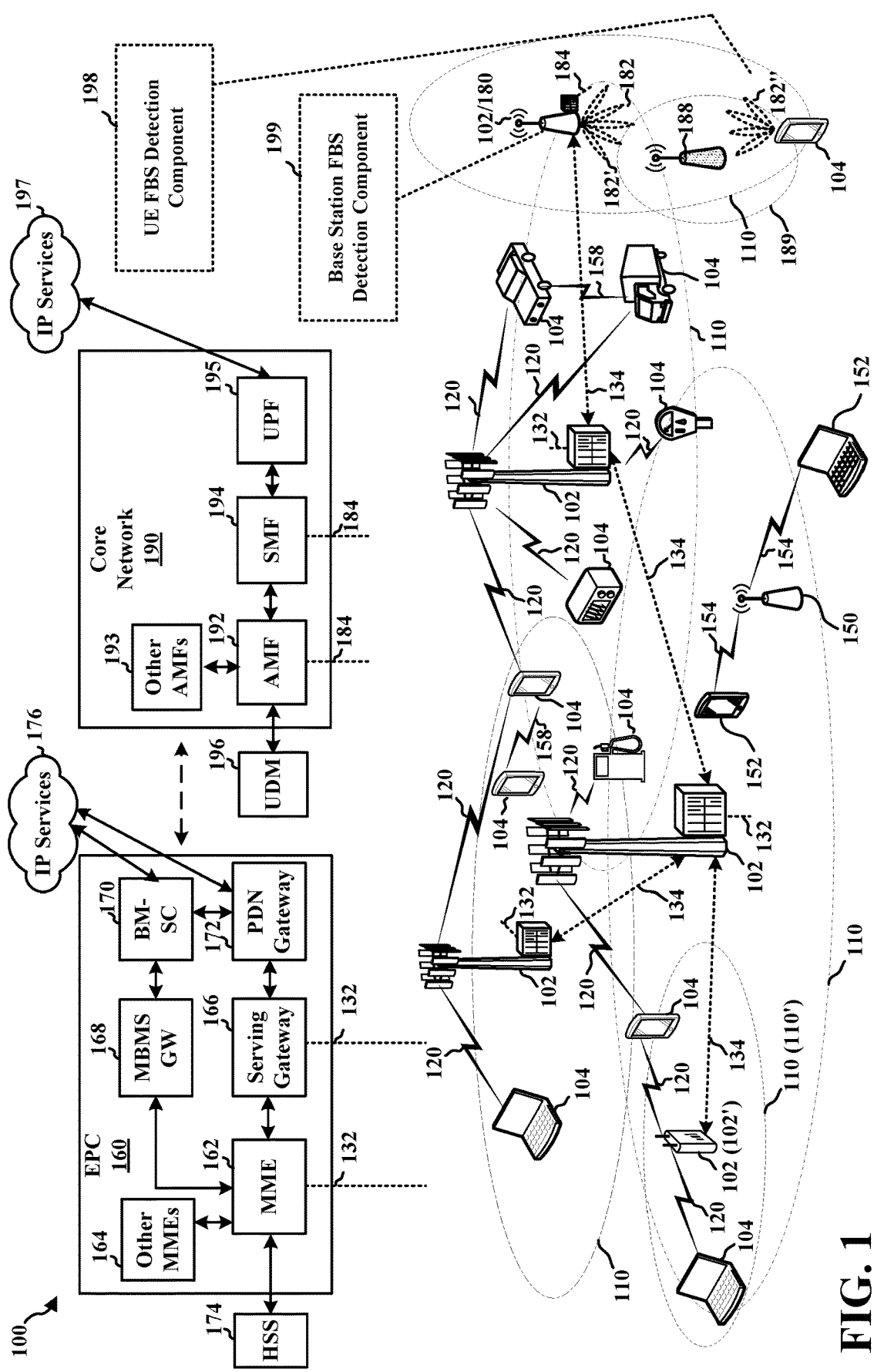
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, a false base station (FBS) 188 may divide a communications link between the UE 104 and the base station 102/180, such as with a man-in-the-middle (MITM) attack. Thus, the FBS 188 may act as a UE (e.g., the UE 104) toward the base station 102/180, and may act as a legitimate base station (e.g., the base station 102/180 belonging to the access network 100 that the UE 104 is trying to access for service) toward the UE 104. For example, the FBS 188 may operate a cell 189 that is configured with a same physical cell identity (PCI) as the cell (e.g., a coverage area 110) operated by the base station 102/180 in order to communicate with the UE 104.

The UE 104 may connect to the FBS 188, and may camp on the cell 189 operated by the FBS 188. However, the UE 104 may be configured to detect whether a cell on which the UE 104 camps is operated by an FBS. Specifically, the UE 104 may be configured to determine whether the cell 189 is operated by the FBS 188 based on a difference between a system timing estimated from first signals received from neighboring cells and another first signal received from the cell 189. In various aspects, a base station (e.g., the base station 102/180, another base station 102, a small cell 102') may be configured to facilitate the determination of whether the cell 189 is operated by the FBS 188, such as by transmitting information to the UE 104 based upon which the UE 104 may make the determination.

In some examples, a wireless communication device, such as a UE 104, may be configured to manage one or more aspects of wireless communication by facilitating detection of a false base station based on signal times of arrival. As an example, in FIG. 1, the UE 104 may include a UE FBS detection component 198 configured to receive a signal from each of one or more neighboring base stations, each of the received signals being associated with a different, unique physical cell identity (PCI). The example UE FBS detection component 198 may also be configured to determine a system timing associated with the wireless communications network based on a respective time of arrival at which each signal is received from the neighboring base stations. Additionally, the example UE FBS detection component 198 may be configured to receive a signal from an FBS, the signal received from the FBS being associated with a PCI different than the PCIs associated with the signals received from each of the neighboring base stations. The example UE FBS detection component 198 may also be configured to identify a presence of the FBS based on a difference between the system timing and a time of arrival at which the signal is received from the FBS.

Still referring to FIG. 1, in some examples, a wireless communication device, such as a base station 102/180, may be configured to manage one or more aspects of wireless communication by enabling a UE to detect a false base station based on signal times of arrival. As an example, in FIG. 1, the base station 102/180 may include a base station FBS detection component 199 configured to determine a timing threshold associated with detection of a false base station by a UE. In some examples, the timing threshold corresponds to a maximum acceptable difference between a system timing and a time of arrival at which a signal is received from the FBS by the UE. The example base station FBS detection component 199 may also be configured to transmit the timing threshold to the UE for the detection of the false base station by the UE.

Although the following description provides examples directed to 5G NR, the concepts described herein may be applicable to other similar areas, such as LTE, LTE-A, CDMA, GSM, and/or other wireless technologies, in which an access network may be susceptible to an MITM attack.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
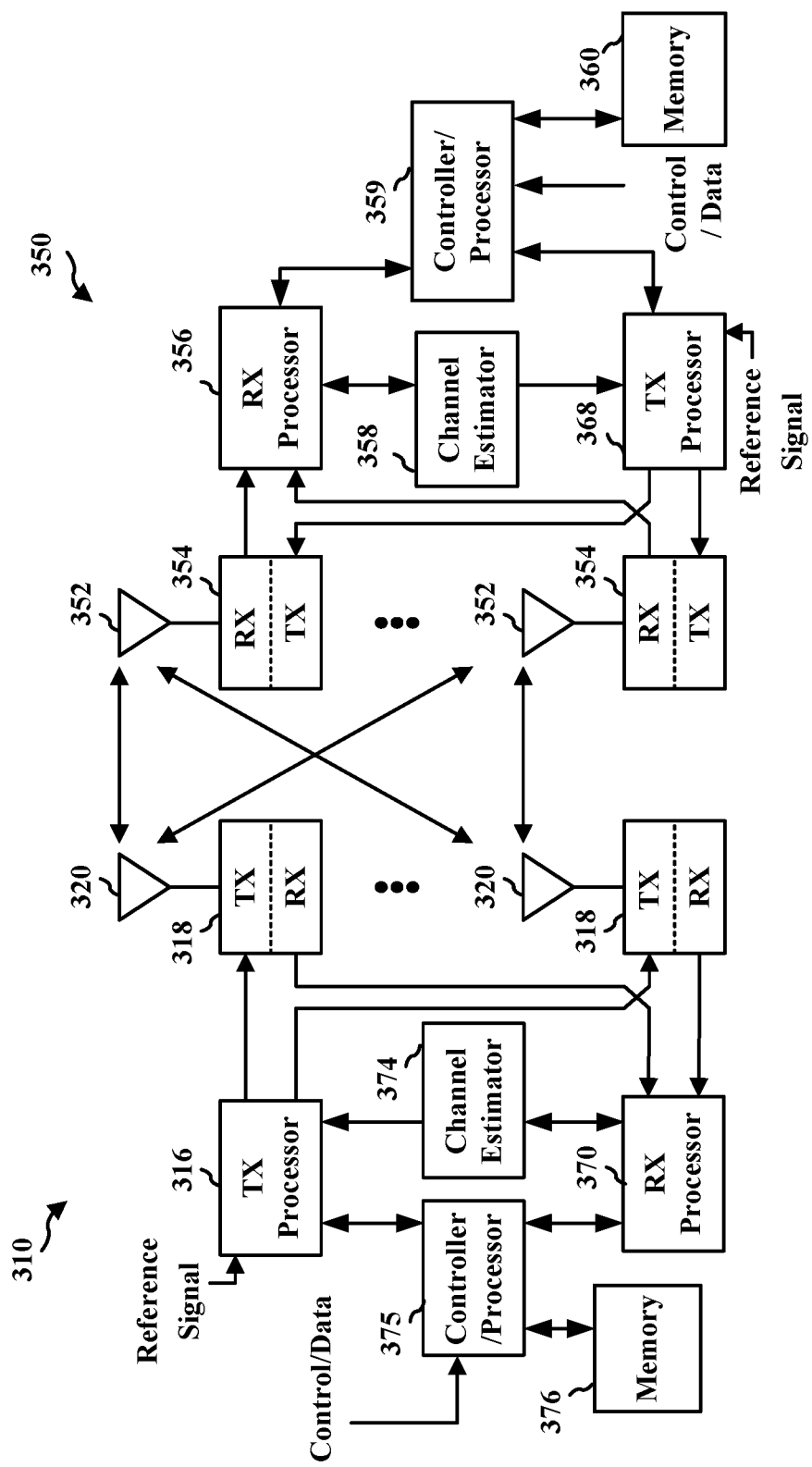
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor (e.g., an RX processor 356). The TX processor (e.g., a TX processor 368) and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE FBS detection component 198 of FIG. 1.

At least one of the TX processor 316, the RX processor 370, and the controller/processor 375 may be configured to perform aspects in connection with the base station FBS detection component 199 of FIG. 1.

In some RANs, security for the air interface may be implemented at relatively higher layers of radio protocol stacks. Signaling that originates at relatively lower layers of radio protocol stacks may be unsecured. For example, signaling originating at a PHY layer of a radio protocol stack may be unprotected, e.g., by not implementing security primitives. Consequently, malicious or otherwise deleterious systems may mimic legitimate lower-layer signals and/or channels (e.g., legitimate PHY signals and/or channels) in order to attack or illicitly access a UE.

An example of a malicious system includes an FBS. For unauthorized communication with a UE, an FBS may transmit synchronization signals to the UE so that the UE will synchronize to the FBS. The FBS may attack the UE once the UE is connected to the FBS and/or camped on a cell operated by the FBS, such as by infecting the UE with malware, stealing confidential information, and so forth.

An FBS may act as one form of an MITM attacker by residing between a UE and a legitimate base station, thereby effectively bisecting a communications link between the UE and the legitimate base station. In doing so, the FBS may operate as a (potentially) malicious repeater. Both the UE and the legitimate base station may be unaware of the presence of the FBS and, therefore, the UE may recognize the FBS as the legitimate base station while the legitimate base station may recognize the FBS as the UE. The FBS, acting as an MITM attacker, may alter or inject unsecure and/or harmful transmissions into the communications link between the UE and the legitimate base station and/or may selectively drop some (secure or unsecure) transmissions from the communications link in one or both directions (e.g., uplink and/or downlink).

In many scenarios, the MITM FBS may use the same PCI as the legitimate base station. In particular, because access stratum (AS) security keys are at least partially derived from a PCI of a serving cell, the MITM FBS can use the same PCI in order to remain undetected while relaying unmodified secure signaling messages. For example, absent use of the PCI of the legitimate cell, secure signaling messages relayed by the MITM FBS may fail message integrity checks by the UE.

Such secure signaling messages relayed by the MITM FBS may include control information, which may be carried on a control channel. The MITM FBS may selectively drop some control information, e.g., in order to insert its own control information for processing by the UE. The MITM FBS may selectively drop some control information rather than all control information because preventing the UE from receiving all control information may reveal the MITM attack and/or may lead to cell reselection by the UE away from the cell of the MITM FB S.

In order to selectively drop some secure signaling messages from the legitimate base station to the UE, the MITM FBS needs to decode those secure signaling messages to, for example, determine corresponding actions based on the information in a message and/or to determine whether the message should be relayed without dropping to avoid detection or cell reselection by the UE. However, decoding secure signaling messages intended for the UE from the legitimate base station introduces delay on the communications link between the UE and the legitimate base station.

Figure 4:
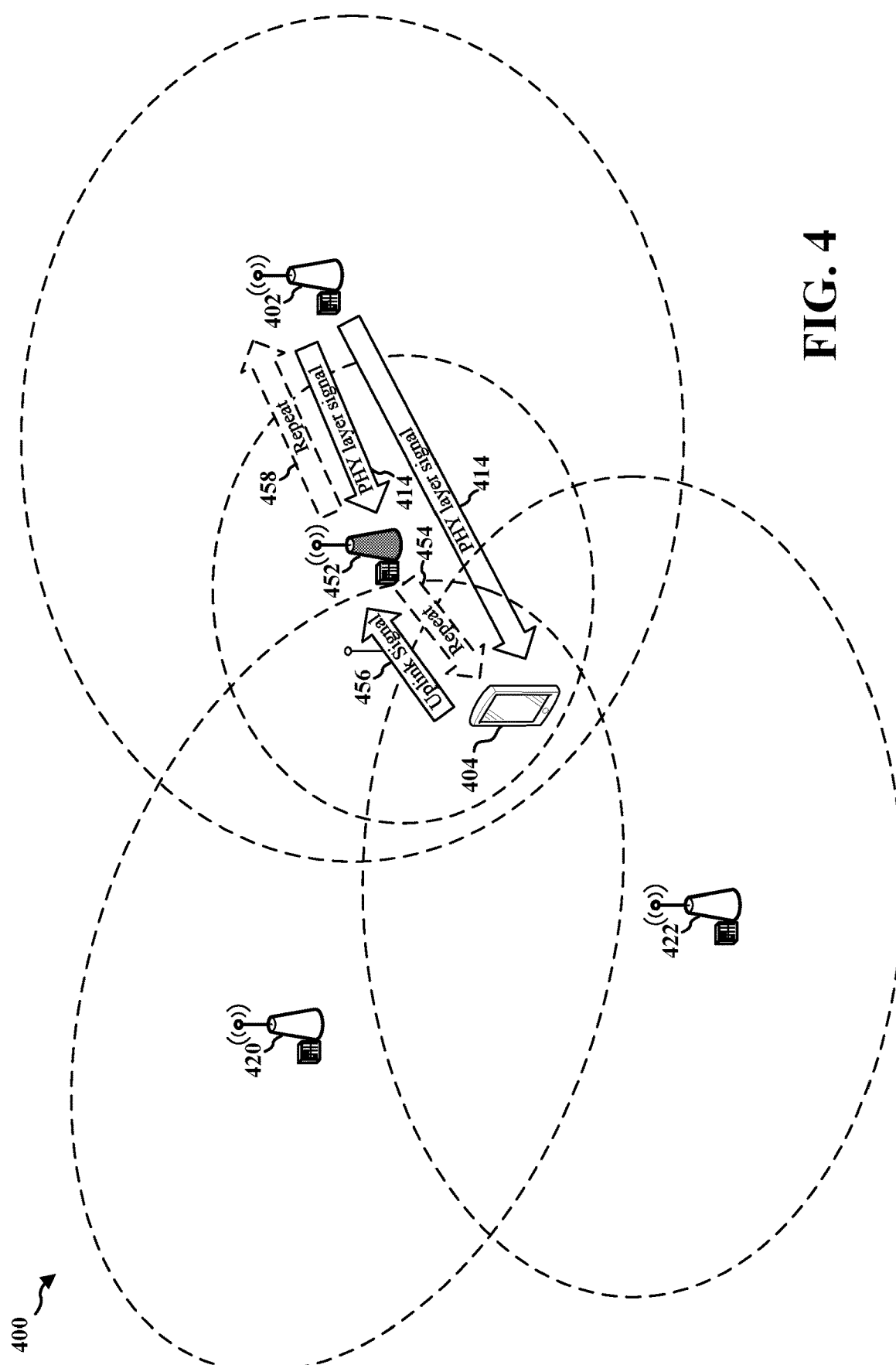
FIG. 4 is a diagram illustrating an example of an MITM attack by an FBS in an access network, in accordance with various aspects of the present disclosure.

FIG. 4 of the present disclosure describes an example of a potential MITM attack by an FBS in an access network. As described herein, the potential MITM attack by the FBS may introduce unexpected delays on a communications link between a UE and a legitimate base station, and, thus, detection of such delays may alert the UE to the presence of the MITM FBS. FIGS. 5 to 10 of the present disclosure describe various techniques and approaches to facilitate the detection of delays introduced by an MITM FBS, as well as to facilitate the detection and avoidance of the MITM FBS causing the delays.

FIG. 4 is a diagram of an example access network 400 including an FBS 452 in communication with a UE 404. The access network 400 may include a legitimate cell 402 that the FBS 452 imitates. The access network 400 may also include a first additional cell 420 and a second additional cell 422 that represent other legitimate cells. The UE 404 may be within a coverage area of the FBS 452, the legitimate cell 402, and zero or more of the additional cells 420, 422. In 3GPP cellular technologies, such as LTE and 5G NR, some security features for the air interface may be implemented at the PDCP layer through ciphering and integrity protection of data and signaling packets. Any signaling that originates below the PDCP layer may not be secured by the ciphering and integrity protection. In particular, PHY layer channels and signals such as the SS/PBCH block, PDCCH, PUCCH, random access channel (RACH), reference signals (e.g., a CSI-RS and/or an SRS) may not be protected through any security primitives. This means that in an open standard such as 5G NR, an adversary can construct these PHY layer channels and signals and launch various attacks against the system. Such attacks can include selective jamming against a particular PHY channel and FBS attacks.

An FBS poses a security threat to wireless communication systems. The FBS 452 may be a device that transmits synchronization signals to get the UE 404 to synchronize to the FBS 452. For example, the FBS 452 may transmit the synchronization signals (e.g., SS/broadcast channel block) with a relatively high power so that the UE 404 will be more likely to select the FBS 452 than the legitimate cell 402. Once the UE 404 is camped on or connected to the FBS 452, the FBS 452 may be able to launch different types of attacks against the UE. The SS/broadcast channel block may include an SS/physical broadcast channel (PBCH) block.

For instance, a MITM FBS 452 may logically sit in the middle of the UE 404 and the legitimate cell 402 in the form of a malicious repeater. The FBS 452 acts as a legitimate cell towards the UE 404 and as a UE towards the legitimate cell 402. For instance, in the downlink, the FBS 452 may receive a PHY layer signal 414 from the legitimate cell 402 and generate a repeated PHY layer signal 454. However, the FBS 452 may modify the repeated PHY layer signal 454 or inject unsecure transmissions as well as selectively drop some (secure or unsecure) transmissions on either link direction. The UE 404 may receive and decode the repeated PHY layer signal 454. Although the UE 404 may also receive the PHY layer signal 414 from the legitimate cell 402, since the UE404 is synchronized to the FBS 452, the UE 404 may not decode the PHY layer signal 414. As another example, in the uplink, the UE 404 may transmit an uplink signal 456 that is received by the FBS 452. The FBS 452 may repeat the uplink signal 456 as a repeated uplink signal 458, may modify the uplink signal 456, or may drop the uplink signal 456.

The dropping of transmissions by a MITM FBS is especially problematic since the dropped transmission (e.g., the PHY layer signal 414) could be cryptographically secure (e.g., ciphered and integrity protected). Yet, if the MITM FBS drops only a selected subset of transmissions, then the FBS 452 may go undetected for a substantial length of time. Such attacks are especially feasible on PDCCH since a dropped PDCCH transmission may be treated by the UE 404 as if there were no transmission.

As an example of an attack, the MITM FBS 452 may selectively drop all PDCCH transmissions from the legitimate cell 402 that carry Short Messages indicating a public warning system (PWS) notification, such as an emergency warning message. Then any UE 404 connected to the legitimate cell 402 via the FBS 452 would not receive emergency warning messages and, thus, the UE 404 would be the victim of a denial of service attack. Since the UE 404 is unaware of incoming PWS notifications on PDCCH, the FBS 452 may go undetected for a substantial length of time, which is undesirable.

Several characteristics of the FBS 452 may be inferred based on an assumption that the FBS 452 tries to remain undetected. For example, an MITM FBS 452 may typically be configured to use the same PCI as the legitimate cell 402. This is because the AS security keys used for PDCP security are derived using, amongst other parameters, the PCI of the serving cell (e.g., the legitimate cell 402). Accordingly, in order to relay secure signaling messages unmodified and remain undetected, the FBS 452 may be configured to use the same PCI as the legitimate cell. If a different PCI were used, the integrity protection at the UE 404 would fail and the UE 404 may detect the FBS 452.

In some examples, in order to remain undetected, the MITM FBS 452 may avoid dropping all PDCCH transmissions. For example, if the FBS 452 were to drop all PDCCH transmissions including those scheduled on the system information (SI) radio network temporary identifier (RNTI), the UE 404 would not be able to decode the SI and may suspect malicious behavior or find another cell. Similarly, the FBS 452 may avoid dropping a PDCCH scheduling a signaling radio bearer (SRB) message since the dropped SRB message may lead to an RRC or a NAS procedure timeout. The UE 404 may reselect to a new cell in response to such timeouts. In turn, the UE 404 moving away from the MITM FBS 452 negates the attack objective.

In some examples, in order to selectively drop PDCCH transmissions, the FBS 452 may need to decode the PHY layer signal 414 from the legitimate cell 402 and decide on a subsequent action (e.g., repeat as repeated PHY layer signal 454 or drop) depending on the nature of the PHY layer signal 414. Accordingly, such an FBS with the ability to decode PHY layer or layer 1 transmissions (e.g., PDCCH) may be referred to as an L1 MITM FBS.

In some examples, the action to decode PDCCH and decide on subsequent action, introduces extra delay in the downlink (e.g., repeated PHY layer signal 454) from the FBS 452 to the UE 404 compared to the downlink (e.g., PHY layer signal 414) from the legitimate cell 402 to the UE 404. The amount of extra delay may be on the order of the PDCCH transmission duration. In 5G NR, the minimum and maximum allowed PDCCH durations are one and three time-domain ODFM symbols respectively. The symbol length may vary based on the numerology or sub-carrier spacing, but may be known to the UE based on the configuration.

Figure 5:
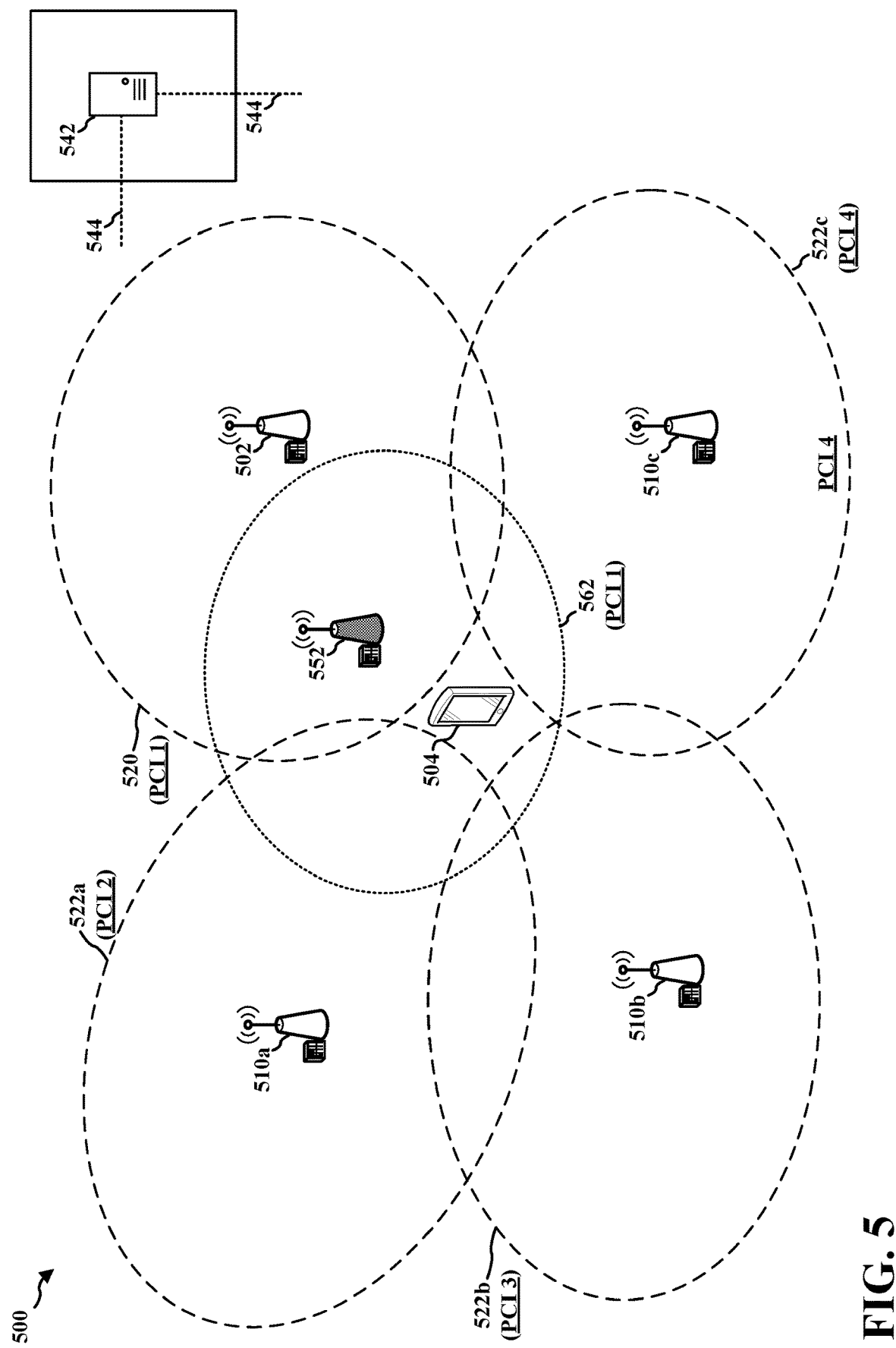
FIG. 5 is a diagram illustrating another example of a MITM attack by a FBS in an access network, in accordance with various aspects of the present disclosure.
Figure 6:
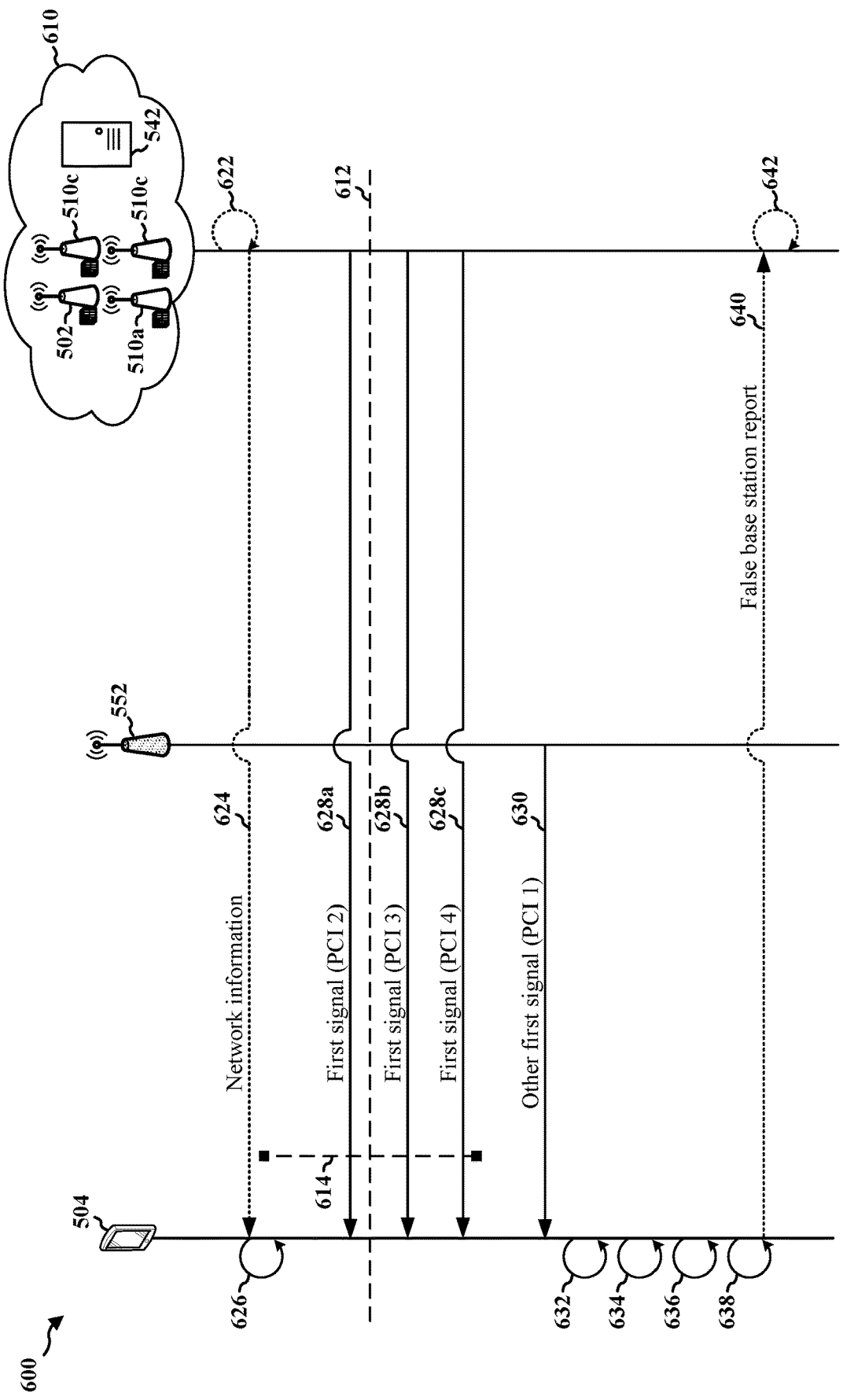
FIG. 6 is an example communication flow illustrating an example of detection and mitigation of an MITM attack by an FBS in an access network, in accordance with the teachings disclosed herein.

FIGS. 5 and 6 are diagrams of various operations in an example access network 500. FIG. 5 is a block diagram that illustrates the elements in the access network 500, including a UE 504, a legitimate base station 502 operating a serving cell 520, one or more legitimate neighboring base stations 510a, 510b, 510c respectively operating one of the legitimate neighboring cells 522a, 522b, 522c, a security server 542, and an FBS 552 operating another cell 562. FIG. 6 is a call flow diagram 600 that illustrates operations and communications by the aforementioned elements.

Each of the UE 504, the legitimate base station 502, the neighboring base stations 510a, 510b, 510c, and/or the FBS 552 may be implemented as one or more analogous or similar elements described in one or more of FIGS. 1, 3, and 4. For example, the UE 504 may be implemented as the UE 104, the UE 350, and/or the UE 404. The legitimate base station 502 may be implemented as the base station 102/180 (including small cell 102'), the base station 310. The corresponding legitimate cell 520 may be implemented as a coverage area 110, the coverage area 110' and/or the legitimate cell 402. Each of the neighboring base stations 510a, 510b, 510c may be implemented as the base station 102/180 (including small cell 102'), the base station 310, and the respective corresponding cells 522a, 522b, 522c may be implemented as a coverage area 110, the coverage area 110', and/or one of the additional cells 420, 422. The FBS 552 may be implemented as the FBS 188 and/or the FBS 452, and the corresponding ambiguous cell 562 may be implemented as the cell 189. The security server 542 may be implemented as an element of the EPC 160 or the core network 190, and may communicate with one or more of the legitimate base station 502 and/or neighboring base stations 510a, 510b, 510c via one or more backhaul links 544 (e.g., the backhaul links 132 or the backhaul links 184).

Referring first to FIG. 5, each of the legitimate base station 502 and the neighboring base stations 510a, 510b, 510c may configure a corresponding one of the legitimate cell 520 and neighboring cells 522a, 522b, 522c with a respective unique PCI. Each unique PCI may be used to at least partially derive AS security keys used for PDCP security in a corresponding one of the legitimate cell 520 and neighboring cells 522a, 522b, 522c. Similarly, the FBS 552 may configure the ambiguous cell 562 with a PCI. As the FBS 552 imitates the legitimate base station 502 in the access network 500, the FBS 552 may configure the ambiguous cell 562 with a PCI that is the same as that with which the legitimate base station 502 configures the legitimate cell 520.

The UE 504 may attempt to connect to the legitimate base station 502 and subsequently camp on the legitimate cell 520 operated by the legitimate base station 502. However, the distance between the legitimate base station 502 and the UE 504 may prohibit the UE 504 from camping on the legitimate cell 520. The UE 504 may be unaware of this prohibitive distance, and may connect with the FBS 552 to camp on the ambiguous cell 562 operated by the FBS 552 under the assumption that the FBS 552 is the legitimate base station 502. In particular, the UE 504 may identify the cells in the access network 500 through their corresponding unique PCIs and, consequently, the UE 504 may assume that the ambiguous cell 562 is the legitimate cell 520 because the FBS 552 configures the ambiguous cell 562 to duplicate the PCI of the legitimate cell 520.

In some geographical areas covered by the access network 500, the inter-site distance between any two base stations 502, 510a, 510b, 510c may be less than ten kilometers (km). An inter-site distance refers to a nominal distance between base station sites deployed within the access network 500. Cells within such a geographical area may share the same transmission timing for some channels (e.g., a PDCCH) and/or for some signals (e.g., SS/broadcast channel blocks, such as SS/PBCH blocks, and/or reference signals, such as CSI-RSs), or other synchronization/reference signals). Accordingly, the legitimate base station 502 and the neighboring base stations 510a, 510b, 510c may communicate (e.g., over backhaul links) to negotiate a synchronized system timing observed across all of the legitimate cell 520 and the neighboring cells 522a, 522b, 522c.

According to various aspects, a thirty kHz subcarrier spacing in the access network 500 may correspond to a duration of 33.3 microseconds (μs) or ten km at the speed of light. With an inter-site distance of less than ten km between any two of the base stations 502, 510a, 510b, 510c operating legitimate cells 520, 522a, 522b, 522c, the system timing synchronized across those cells 520, 522a, 522b, 522c may be less than one OFDM time-domain symbol duration. As inter-site distances greater than or equal to ten km may be uncommon in the access network 500, signals/channels occurring outside approximately less than one symbol duration of the generally synchronized system timing may indicate the presence of an FBS because the FBS will introduce unexpected delays in transmissions to the UE 504.

Specifically, the FBS 552 may selectively drop some signaling (e.g., on a PDCCH) in order to insert its own information for processing by the UE 504. To selectively drop some signaling from the legitimate base station 502 to the UE 504, the FBS 552 needs to decode that signaling, to, for example, determine corresponding actions based on the signaled information and/or to determine whether the signaling should be relayed without dropping to avoid detection or cell reselection by the UE 504. However, decoding signaling intended for the UE 504 from the legitimate base station 502 introduces delay that may push the signaling beyond approximately one symbol duration of the synchronized system timing when received at the UE 504, thereby causing the cell in which the signaling is transmitted to appear unsynchronized in the access network 500.

Accordingly, the UE 504 may be configured to determine that the ambiguous cell 562 is operated by an FBS (e.g., the FBS 552), and is, therefore, an MITM attacker, when the ambiguous cell 562 appears unsynchronized to the system timing. When the UE 504 detects the MITM FBS 552, the UE 504 may apply one or more mitigation operations designed to avoid communication with the FBS 552. An example of such mitigation operations may include reporting information indicating the presence of the FBS 552 to the security server 542.

With reference to FIG. 6, a network 610 with which the UE 504 communicates may include, inter alia, the legitimate base station 502, the neighboring base stations 510a, 510b, 510c, and the security server 542. The network 610 (e.g., the legitimate base station 502, at least one of the neighboring base stations 510a, 510b, 510c, another base station, etc.) may determine 622 network information 624. In one aspect, the network information 624 determined by the network 610 may include a timing threshold 614 associated with detection of an FBS by the UE 504. For example, the timing threshold 614 may correspond to a maximum acceptable difference between a system timing and a time of arrival at which a first signal is received from another cell, which may be suspected of being operated by an FBS.

The network 610 may determine, at 622, the timing threshold 614 based on the inter-site distance between at least two of the neighboring base stations 510a, 510b, 510c respectively operating the neighboring cells 522a, 522b, 522c. According to the aforementioned example, supra, the timing threshold 614 may be at least one symbol duration when the inter-site distance is at most ten km and the subcarrier spacing is thirty kHz.

In another aspect, the network information 624 determined by the network 610 may include the inter-site distance information that indicates at least one inter-site distance between at least two of the neighboring base stations 510a, 510b, 510c respectively operating the neighboring cells 522a, 522b, 522c. Such inter-site distance information may assist the UE 504 in determining the timing threshold 614 and/or a system timing 612.

The network 610 may transmit the network information 624 to the UE 504, e.g., via one of a SIB or UE-specific signaling. The UE 504 may receive the network information 624 and, based thereon, the UE 504 may determine 626 the timing threshold 614. For example, the UE 504 may determine the timing threshold 614 from a value explicitly or implicitly indicated in the network information 624. Alternatively, the UE 504 may determine 626 the timing threshold 614 based on inter-site distance information included in the network information 624, as well as based on the subcarrier spacing used with the UE 504 in the access network 500. Again, the timing threshold 614 may be equal to at least one symbol duration.

The UE 504 may receive a set of first signals 628a, 628b, 628c, 630 from the neighboring base stations 510a, 510b, 510c and the FBS 552. Each of the first signals 628a, 628b, 628c, 630 may be an SS/broadcast channel block (e.g., an SS/PBCH block) or a reference signal (e.g., a CSI-RS). The UE 504 may receive a first signal 628a from the first neighboring cell 522a associated with PCI 2, a first signal 628b from the second neighboring cell 522b associated with PCI 3, and a first signal 628c from the third neighboring cell 522c associated with PCI 4. The UE 504, which assumes it is camping on the legitimate cell 520 associated with PCI 1, may receive another first signal 630 from the ambiguous cell 562 also associated with PCI 1 but operated by the FBS 552.

A signal, a base station, and/or a cell may be referred to as being associated with a same PCI. For example, the first signal 628a, the neighboring base station 510a, and the first neighboring cell 522a may each be referred to as being associated with the PCI 2. As shown in FIG. 6, the signals 628a, 628b, 628c received from each of the neighboring cells 522a, 522b, 522c, respectively, are associated with a different, unique PCI (e.g., a PCI 2, a PCI 3, or a PCI 4). Additionally, while the signal 630 received from the FBS 552 is associated with the same PCI (e.g., a PCI 1) as the legitimate cell 520, the PCI associated with the signal 630 is different than the PCIs associated with the signals 628a, 628b, 628c received from each of the neighboring cells 522a, 522b, 522c.

For each of the first signals 628a, 628b, 628c, 630, the UE 504 may determine (e.g., measure or detect) a respective time of arrival. Each of the times of arrival for a respective one of the first signals 628a, 628b, 628c, 630 may be determined from the first path component of multipath signal components of the respective one of the first signals 628a, 628b, 628c, 630. For example, the UE 504 may determine each of the times of arrival from the earliest reception time of one path component of multipath components composing the respective one of the first signals 628a, 628b, 628c, 630. In some aspects, the times of arrival of the first signals 628a, 628b, 628c, 630, associated with different PCIs 1 through 4, may at least partially correspond to a same tuple of (SFN, slot number, and symbol number) in the access network 500. For example, each entry of the (SFN, slot number, and symbol number) tuple may be an integer value of a respective index corresponding to each of the SFN, slot number, and symbol number, which may be equal across all first path components of the first signals 628a, 628b, 628c, 630 associated with a unique one of the PCIs 1 through 4.

While all first path components of the first signals 628a, 628b, 628c, 630 associated with a unique one of the PCIs 1 through 4 may correspond to the same (SFN, slot number, symbol number) tuple, the actual times of arrival observed for each of the first path components of the first signals 628a, 628b, 628c, 630 may vary (e.g., due to delays caused by propagation and/or MITM attacks). The UE 504 may determine a first time of arrival of an earliest received one of the first signals 628a, 628b, 628c, 630 as a reference point. For example, the UE 504 may determine the time of arrival of the earliest received first signal 628a from the first neighboring cell 522a as a reference point of time T0 associated with PCI 2. Then, the UE 504 may determine each of the times of arrival of the later received first signals 628b, 628c, 630 relative to the reference point of time T0 associated with PCI 2.

For example, the UE 504 may set the reference point of time T0 associated with PCI 2 to 0. Subsequently, the UE 504 may determine (e.g., measure) each of the times of arrival of the first signals 628b, 628c, 630 received from the second and third neighboring cells 522b, 522c and the ambiguous cell 562 relative to the reference point, such as by measuring the time that elapses between the reference point and a respective time of arrival of each of the first signals 628b, 628c, 630 using an internal clock of the UE 504.

By way of illustration, the UE 504 may set the time of arrival associated with PCI 2 of the first signal 628a received from the first neighboring cell 522a to 0 (e.g., the reference point). Next, the UE 504 may measure a second time T2 from the time of arrival associated with PCI 3 of the first signal 628b received from the second neighboring cell 522b, and likewise, may measure a third time T3 from the time of arrival associated with PCI 4 of the first signal 628c received from the third neighboring cell 522c. Further, the UE 504 may measure a fourth time T4 from the time of arrival associated with PCI 1 of the other first signal 630 received from the ambiguous cell 562.

The UE 504 may determine 632 (e.g., estimate) the system timing 612 to which each of the neighboring base stations 510a, 510b, 510c (and the legitimate base station 502) is synchronized. Pursuant to the synchronization of the access network 500, any two times of arrival at which any two of the first signals 628a, 628b, 628c, 630 are received may be within a timing threshold amount of one another. For example, each of times T2 and T3 may be within the timing threshold amount from the reference point of 0. The timing threshold amount may be based on at least one inter-site distance between at least two of the neighboring base stations 510a, 510b, 510c respectively operating the neighboring cells 522a, 522b, 522c. In some aspects, the UE 504 may receive the timing threshold amount from the network 610 (e.g., the timing threshold 614 received via the network information 624).

In determining the system timing 612, the UE 504 may select a subset of the set of first signals 628a, 628b, 628c, 630 such that the difference between any two signals of the subset of the set of first signals 628a, 628b, 628c, 630 is within (e.g., less than) the timing threshold amount. For example, the UE 504 may select those first signals 628a, 628b, 628c received from the neighboring cells 522a, 522b, 522c as the subset from which the system timing 612 is to be determined based on comparing the times of arrival of the set of first signals 628a, 628b, 628c, 630 to one another and determining that the first signals 628a, 628b, 628c received from the neighboring cells 522a, 522b, 522c associated with the PCIs 2, 3, 4, respectively, are within the timing threshold amount of one another.

The UE 504 may determine 632 the system timing 612 by determining an average timing based on the times of arrival at which the first signals 628a, 628b, 628c (e.g., the signals within the timing threshold amount) are received from the neighboring cells 522a, 522b, 522c. In the context of the aforementioned illustration, the UE 504 may average the reference point of 0, the second time T2, and the third time T3 (i.e., (0+T2+T3)÷3). The UE 504 may estimate that the system timing 612 is equal to the average of the reference point, the time T2, and the time T3, assuming each of the times of arrival is equally weighted in the estimation.

In one aspect, the UE 504 may additionally determine (e.g., measure) a value indicative of a power with which each of the first signals 628a, 628b, 628c is received, such as a reference signal received power (RSRP). The UE 504 may weigh each of the determined values indicative of the received powers of the first signals 628a, 628b, 628c, and may determine the average timing based on weighting the powers with which each of the first signals 628a, 628b, 628c is received from the neighboring cells 522a, 522b, 522c. For example, the UE 504 may apply Equation 1 (below) to determine the system timing based on weighting the powers.

$$\text{Timing} = (P_1 * T_1 + P_2 * T_2 + P_3 * T_3)/(P_1 + P_2 + P_3) \quad \text{Equation 1}$$

In Equation 1, the terms $T_1$, $T_2$, $T_3$ refer to a time at which a respective signal is received from a cell. The terms $P_1$, $P_2$, $P_3$ refer to a signal strength (e.g., in watts) associated with a respective signal. For example, the UE 504 may receive a first signal from a first cell at time $T_1$ and with signal $P_1$, may receive a first signal from a first cell at time $T_2$ and with signal $P_2$, and may receive a first signal from a first cell at time $T_3$ and with signal $P_3$. By applying Equation 1, the UE 504 may use power weighting to derive the signal timing based on the timing and signal strength associated with signals. Thus, the UE 504 may compensate for propagation delays over the air that may affect the times of arrival at which the first signals 628a, 628b, 628c are received. Although the example of Equation 1 includes three signals received from three cells at three times and with three signal strengths, other examples may include any suitable quantity of signals, cell, times, and/or signal strengths.

The UE 504 may then determine 634 a difference between the (estimated) system timing 612 and a time of arrival at which the other first signal 630 is received from the ambiguous cell 562 (e.g., the time T4 associated with PCI 1). For example, the UE 504 may subtract the system timing 612 from the time of arrival at which the other first signal 630 is received from the ambiguous cell 562, or vice versa. According to the aforementioned illustration, the UE 504 may calculate the difference of time T4−(0+T2+T3)÷3.

The UE 504 may compare the difference to the timing threshold 614 to determine whether the difference satisfies the timing threshold 614. For example, the difference may satisfy the timing threshold 614 when the difference is equal to or greater than the timing threshold 614. In some aspects, the UE 504 may take the absolute value of the difference between the system timing 612 and the time of arrival at which the other first signal 630 is received for the comparison to the timing threshold 614 to, for example, account for times of arrival that are both before and after the system timing 612.

When the difference satisfies the timing threshold 614, then the UE 504 may determine that the ambiguous cell 562 is unsynchronized in the access network 500. However, the UE 504 may expect a cell associated with PCI 1 to be synchronized in the access network 500. Thus, the UE 504 may determine 636 that the ambiguous cell 562 from which the other first signal 630 is received is operated by the FBS 552 when the UE 504 determines that the difference satisfies the timing threshold 614. Illustratively, the UE 504 may determine 636 that the ambiguous cell 562 from which the other first signal 630 is received is operated by the FBS 552 when the UE 504 determines that T4−(0+T2+T3)÷3 is greater than or equal to a timing threshold 614 of at least one OFDM symbol duration.

In response to the determination 636 that the ambiguous cell 562 is operated by the FBS 552 (and therefore is likely an MITM attacker between the UE 504 and the legitimate base station 502), the UE 504 may apply 638 at least one mitigation operation associated with avoidance of communication with the ambiguous cell 562. In one aspect, the UE 504 may apply 638 the at least one mitigation operation by changing one or more communication parameters associated with accessing the access network 500. To change the communication parameters, the UE 504 may change one or more of a cell on which the UE 504 operates, a frequency band in which the UE 504 communicates, and/or a RAT with which the UE 504 communicates. For example, the UE 504 may perform cell reselection to select away from the ambiguous cell 562 to one of the neighboring cells 522a, 522b, 522c, the UE 504 may switch from mmW communication to communication in a sub-six GHz band, and/or the UE 504 may switch from 5G NR to a legacy or other RAT (e.g., LTE).

In another aspect, the UE 504 may apply 638 the at least one mitigation operation by transmitting a report 640 indicating that the ambiguous cell 562 is operated by the FBS 552 to the network 610. For example, the UE 504 may transmit the report 640 to one of the neighboring base stations 510a, 510b, 510c and/or to the security server 542. The network 610 may receive the report 640 based on the network information 624 transmitted to the UE 504.

Based on the report 640 indicating that the ambiguous cell 562 is operated by the FBS 552, the network 610 (e.g., one of the neighboring base stations 510a, 510b, 510c and/or the security server 542) may apply 642 one or more mitigation operations associated with causing the UE 504 to avoid communication with the ambiguous cell 562. For example, the network 610 may hand over the UE 504 to a cell different from the ambiguous cell 562 operated by the FBS 552, such as by handing over the UE 504 to one of the neighboring cells 522a, 522b, 522c. In another example, the network 610 may change one or more communication parameters associated with the UE 504, such as by transmitting new communication parameters to the UE 504 that configure the UE 504 to deprioritize cell selection/reselection of the ambiguous cell 562 operated by the FBS 552.

Figure 7:
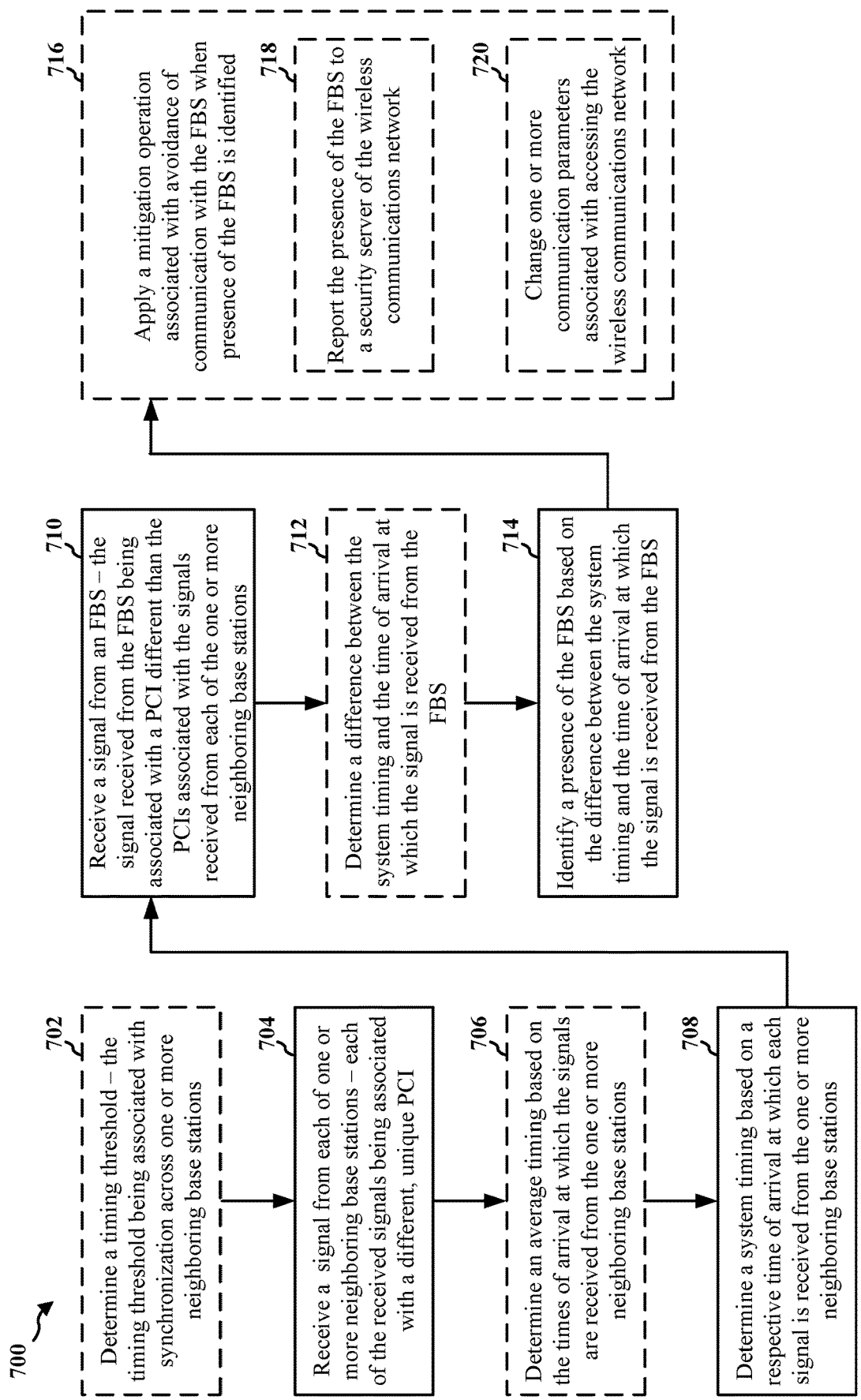
FIG. 7 is a flowchart of a method of wireless communication at a UE facilitating detection and mitigation of an MITM attack by an FBS in an access network, in accordance with the teachings disclosed herein.

FIG. 7 is a flowchart 700 of a method of wireless communication. The method may be performed by a UE in a wireless communications network (e.g., the UE 104, the UE 350, the UE 404, the UE 504, and/or an apparatus 802 of FIG. 8). Optional aspects are illustrated with a dashed line. The method may facilitate detecting a false base station based on signal times of arrival.

At 702, the UE may determine a timing threshold, as described in connection with 626 of FIG. 6. For example, 702 may be performed by a timing threshold component 840 of the apparatus 802 of FIG. 8. The timing threshold may be associated with synchronization across one or more neighboring base stations. For example, the timing threshold may be based on at least one inter-site distance between at least two neighboring base stations respectively operating one or more neighboring base stations. The inter-site distance may comprise a nominal distance between the at least two neighboring base stations deployed within the wireless communications network. In one aspect, the timing threshold may be received from a legitimate base station via one of a SIB or UE-specific signaling. The legitimate base station may comprise a base station bellowing to the wireless communications network that the UE is attempting to access for service. The timing threshold may be equal to at least one symbol duration. For example, referring to FIGS. 5 and 6, the UE 504 may determine 626 the timing threshold 614, such as by receiving the network information 624 from the network 610.

At 704, the UE receives a signal from each of one or more neighboring base stations, as described in connection with first signals 628a, 628b, 628c of FIG. 6. For example, 704 may be performed by a first signals component 842 of the apparatus 802 of FIG. 8. Each of the received signals may be associated with a different, unique PCI. According to various aspects, each signal may be an SS/broadcast channel block or a reference signal. For example, referring to FIGS. 5 and 6, the UE 504 may receive the first signals 628a, 628b, 628c from the neighboring base stations 510a, 510b, 510c operating the neighboring cells 522a, 522b, 522c. In some examples, the SS/broadcast channel block may include an SS/PBCH block. In some examples, the reference signal may include a CSI-RS.

At 706, the UE may determine an average timing based on the times of arrival at which the signals are received from the neighboring base stations, as described in connection with 632 of FIG. 6. For example, 706 may be performed by a system timing component 844 of the apparatus 802 of FIG. 8. In one aspect, the average timing is determined based on weighting powers with which each of the signals is received from the neighboring base stations. For example, referring to FIGS. 5 and 6, the UE 504 may determine an average timing based on the times of arrival at which the first signals 628a, 628b, 628c are received from the neighboring base stations 510a, 510b, 510c operating the neighboring cells 522a, 522b, 522c. In some examples, the UE may apply Equation 1 (above) to determine the system timing based on weighting the powers.

At 708, the UE determines a system timing associated with the wireless communications network based on a respective time of arrival at which each signal is received from the neighboring base stations, as described in connection with 632 of FIG. 6 For example, 708 may be performed by the system timing component 844 of the apparatus 802 of FIG. 8. The UE may determine the system timing based on the determined average timing, which may be weighted. In one aspect, the system timing may be determined when any two times of arrival at which any two signals are received from at least two neighboring base stations are within a timing threshold amount of one another. The timing threshold amount may be based on at least one inter-site distance between at least two neighboring base stations respectively operating the neighboring base stations. The inter-site distance may comprise a nominal distance between the at least two neighboring base stations deployed within the wireless communications network. For example, referring to FIGS. 5 and 6, the UE 504 may determine 632 the system timing 612 based on a respective time of arrival at which each of the first signals 628a, 628b, 628c is received from the neighboring base stations 510a, 510b, 510c operating the neighboring cells 522a, 522b, 522c.

At 710, the UE receives a signal from an FBS, as described in connection with the other first signal 630 of FIG. 6. For example, 710 may be performed by the first signals component 842 of the apparatus 802 of FIG. 8. The signal received from the FBS may be associated with a PCI that is different than the PCIs associated with the signals received from each of the neighboring base stations. For example, referring to FIGS. 5 and 6, the UE 504 may receive the other first signal 630 from the ambiguous cell 562, which may be associated with the same PCI (e.g., PCI 1) as the legitimate cell 520 operated by the legitimate base station 502.

At 712, the UE may determine a difference between the system timing and the time of arrival at which the signal is received from the FBS, as described in connection with 634 of FIG. 6. For example, 712 may be performed by a difference component 846 of the apparatus 802 of FIG. 8. For example, referring to FIGS. 5 and 6, the UE 504 may determine 634 a difference between the system timing 612 and the time of arrival at which the other first signal 630 is received from the ambiguous cell 562.

At 714, the UE identifies a presence of the FBS based on the difference between the system timing and the time of arrival at which the signal is received from the FBS, as described in connection with 636 of FIG. 6. For example, 714 may be performed by an FBS determination component 848 of the apparatus 802 of FIG. 8. In one aspect, the UE may compare the difference to the timing threshold, and the UE may identify the presence of the FBS when the difference satisfies (e.g., meets or exceeds) the timing threshold. For example, referring to FIGS. 5 and 6, the UE 504 may determine 636 that the ambiguous cell 562 is operated by the FBS 552 based on a difference between the system timing 612 and the time of arrival at which the other first signal 630 is received from the ambiguous cell 562.

At 716, the UE may apply a mitigation operation associated with avoidance of communication with the FBS when presence of the FBS is identified, as described in connection with 638 of FIG. 6. For example, 716 may be performed by a mitigation component 850 of the apparatus 802 of FIG. 8. For example, referring to FIGS. 5 and 6, the UE 504 may apply 638 at least one mitigation operation when the ambiguous cell 562 is determined to be operated by the FBS 552.

In some examples, to apply the mitigation operation, the UE, at 718, may report the presence of the FBS to a security server of the wireless communications network, as described in connection with the report 640 of FIG. 6. For example, 718 may be performed by a report component 852 of the apparatus 802 of FIG. 8. For example, referring to FIGS. 5 and 6, the UE 504 may transmit the report 640 indicating that the ambiguous cell 562 is operated by the FBS 552 to the network 610, which includes the security server 542.

In some examples, to apply the mitigation operation, the UE, at 720, may change one or more communication parameters associated with accessing the wireless communications network, as described in connection with 638 of FIG. 6. For example, 720 may be performed by a parameters changing component 854 of the apparatus 802 of FIG. 8. The one or more communication parameters may include at least one of a base station on which the UE operates, a frequency band in which the UE communicates, or a RAT with which the UE communicates. For example, referring to FIGS. 5 and 6, the UE 504 may change one or more communication parameters associated with accessing the access network 500. To change the one or more communication parameters, the UE 504 may change one or more of a base station on which the UE 504 operates, a frequency band in which the UE 504 communicates.

Figure 8:
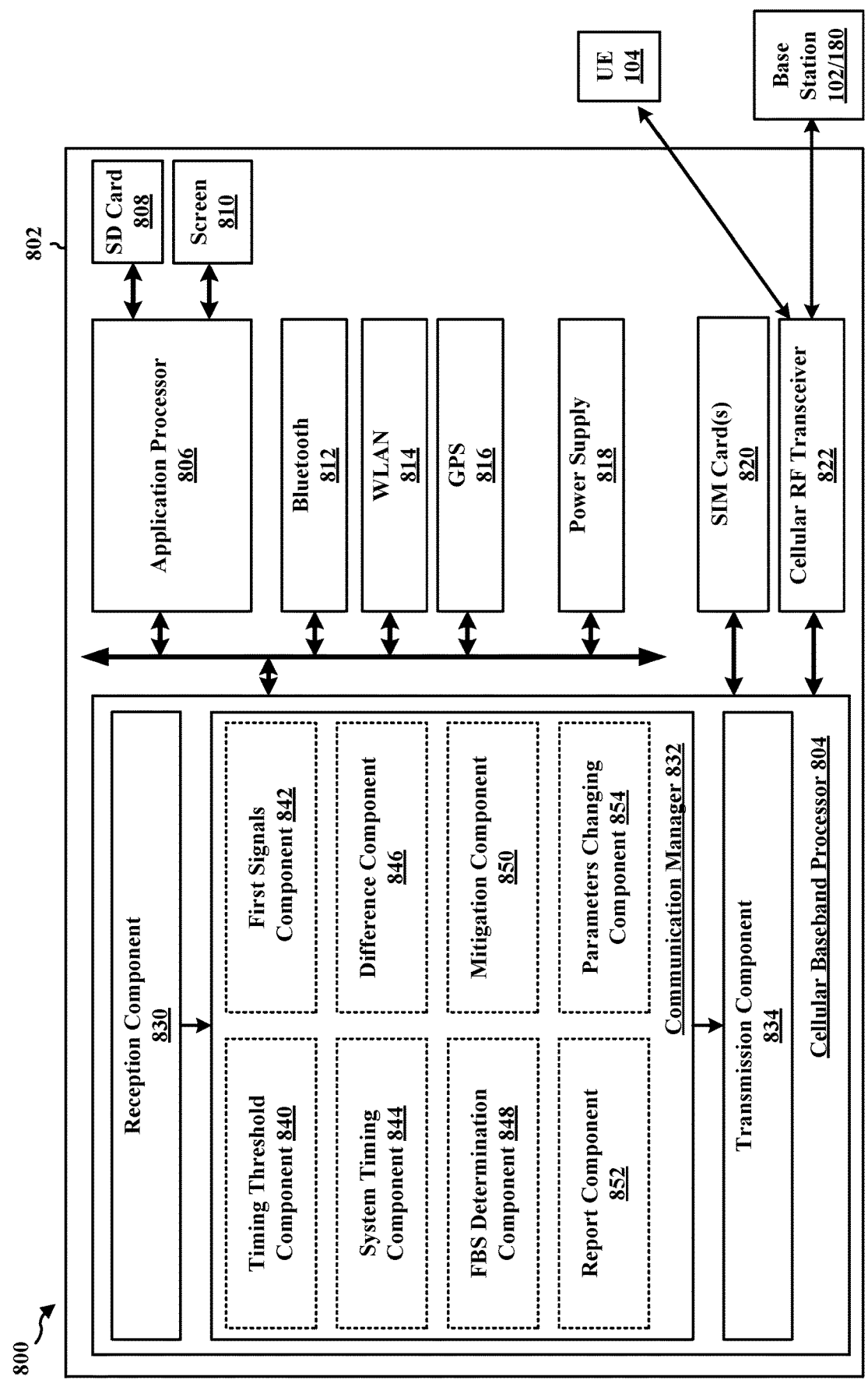
FIG. 8 is a diagram illustrating an example of a hardware implementation for an example apparatus, in accordance with the teachings disclosed herein.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see the UE 350 of FIG. 3) and include the aforediscussed additional modules of the apparatus 802.

The communication manager 832 includes a timing threshold component 840 that is configured to determine a timing threshold, e.g., as described in connection with 702 of FIG. 7. The communication manager 832 further includes a first signals component 842 that is configured to receive a signal from each of one or more neighboring base stations and/or receive a signal from an FBS, and where the signal received from each of the neighboring base stations and the signal received from the FBS are each associated with a different, unique PCI, e.g., as described in connection with 704 and 710 of FIG. 7. The communication manager 832 further includes a system timing component 844 that is configured to determine an average timing based on the times of arrival at which the signals are received from each of the neighboring base stations and/or determine a system timing associated with the wireless communications network based on a respective time of arrival at which each signal is received from the neighboring base stations, e.g., as described in connection with 706 and 708 of FIG. 7. The communication manager 832 further includes a difference component 846 that is configured to determine a difference between the system timing and the time of arrival at which the signal is received from the FBS, e.g., as described in connection with 712 of FIG. 7. The communication manager 832 further includes an FBS determination component 848 that is configured to identify a presence of the FBS based on the difference between the system timing and the time of arrival at which the signal is received from the FBS, e.g., as described in connection with 714 of FIG. 7. The communication manager 832 further includes a mitigation component 850 that is configured to apply a mitigation operation associated with avoidance of communication with the FBS when presence of the FBS is identified, e.g., as described in connection with 716 of FIG. 7. The communication manager 832 further includes a report component 852 that is configured to report the presence of the FBS to a security server of the wireless communications network, e.g., as described in connection with 718 of FIG. 7. The communication manager 832 further includes a parameters changing component 854 that is configured to change one or more communication parameters associated with accessing the wireless communications network, e.g., as described in connection with 720 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving a signal from each of one or more neighboring base stations, each of the neighboring base stations being associated with a different, unique physical cell identity (PCI). The example apparatus 802 also includes means for determining a system timing associated with the wireless communications network based on a respective time of arrival at which each signal is received from the neighboring base stations. The example apparatus 802 also includes means for receiving a signal from an FBS associated with a different, unique PCI. The example apparatus 802 also includes means for identifying a presence of the FBS based on a difference between the system timing and a time of arrival at which the signal is received from the FBS. The example apparatus 802 also includes means for determining the difference between the system timing and the time of arrival at which the signal is received from the FBS, and where the presence of the FBS is identified when the difference satisfies a timing threshold. The example apparatus 802 also includes means for determining the timing threshold. The example apparatus 802 also includes means for determining an average timing based on the times of arrival at which the signals are received from the neighboring cells, and where the system timing is determined based on the average timing. The example apparatus 802 also includes means for applying a mitigation operation associated with avoidance of communication with the FBS when the presence of the FBS is identified. The example apparatus 802 also includes means for reporting the presence of the FBS to a security server of the wireless communications network. The example apparatus 802 also includes means for changing one or more communication parameters associated with accessing the wireless communications network.

The aforementioned means may be one or more of the aforementioned components of the apparatus 802 configured to perform the functions recited by the aforementioned means. As described supra, the apparatus 802 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 9:
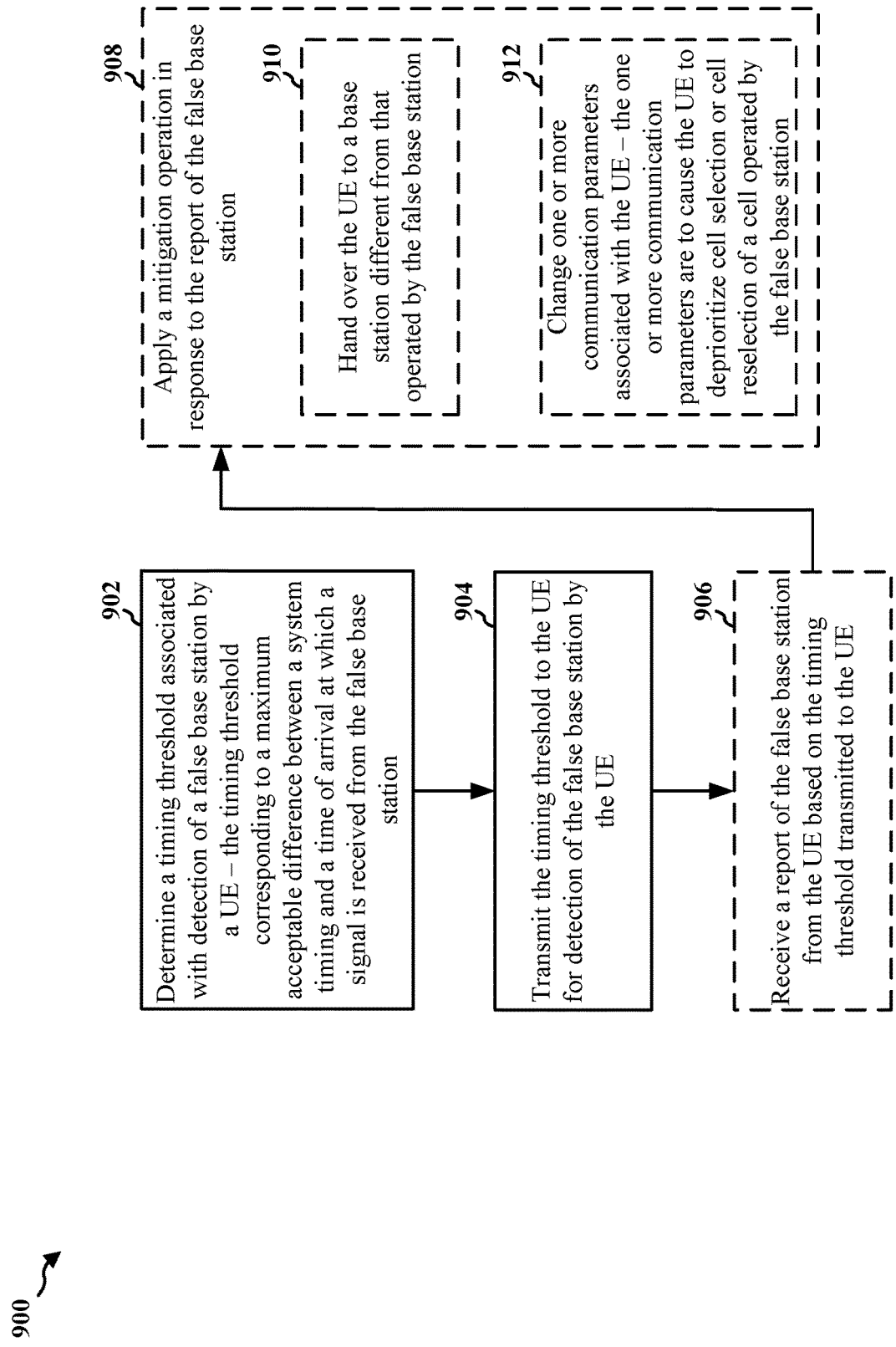
FIG. 9 is a flowchart of a method of wireless communication at a base station facilitating detection and mitigation of an MITM attack by an FBS in an access network, in accordance with the teachings disclosed herein.

FIG. 9 is a flowchart 900 of a method of wireless communication. The method may be performed by a base station operating a cell (e.g., the base station 102/180, the base station 310, the legitimate base station 502, the base stations 510a, 510b, 510c, the legitimate cell 402, the cells 420, 422, and/or an apparatus 1002 of FIG. 10). Optional aspects are illustrated with a dashed line. The method may facilitate a UE to detect a false base station based on signal times of arrival.

At 902, the base station determines a timing threshold associated with detection of a false base station by a UE, as described in connection with 622 of FIG. 6. For example, 902 may be performed by a timing threshold component 1040 of the apparatus 1002 of FIG. 10. The timing threshold may correspond to a maximum acceptable difference between a system timing and a time of arrival at which a signal is received from the FBS. The timing threshold may be based on at least one inter-site distance between at least two base stations respectively operating one of a set of base stations neighboring the UE. The inter-site distance may comprise a nominal distance between the at least two base stations deployed within the wireless communications network. The timing threshold may be equal to at least one symbol duration. For example, referring to FIGS. 5 and 6, the network 610 may determine the network information 624, which may include determining the timing threshold 614.

At 904, the base station transmits the timing threshold to the UE for detection of the false base station by the UE, as described in connection with the network information 624 of FIG. 6. For example, 904 may be performed by an information transmission component 1042 of the apparatus 1002 of FIG. 10. The timing threshold may be transmitted via one of a SIB or UE-specific signaling. For example, referring to FIGS. 5 and 6, the network 610 may transmit the network information 624 to the UE 504, which may include information indicating the timing threshold 614.

At 906, the base station may receive a report of the false base station from the UE based on the timing threshold transmitted to the UE, as described in connection with the report 640 of FIG. 6. For example, 906 may be performed by a report component 1044 of the apparatus 1002 of FIG. 10. For example, referring to FIGS. 5 and 6, the network 610 may receive, from the UE 504 and based on the network information 624, the report 640 indicating that the other cell 562 is operated by the FBS 552 to the network 610.

At 908, the base station may apply a mitigation operation in response to the report of the false base station, as described in connection with 642 of FIG. 6. For example, 908 may be performed by a mitigation component 1046 of the apparatus 1002 of FIG. 10. The mitigation operation may be associated with avoidance of communication by the UE with the false base station. For example, referring to FIGS. 5 and 6, the network 610 may apply 642 one or more mitigation operations associated with causing the UE 504 to avoid communication with the other cell 562 based on the report 640 indicating that the other cell 562 is operated by the FBS 552.

In some examples, to apply the mitigation operation, the base station, at 910, may hand over the UE to a base station different from that operated by the false base station, as described in connection with 642 of FIG. 6. For example, 910 may be performed by a hand over component 1048 of the apparatus 1002 of FIG. 10. For example, referring to FIGS. 5 and 6, the network 610 may hand over the UE 504 to a cell different from the other cell 562 operated by the FBS 552, such as by handing over the UE 504 to one of the neighboring cells 522a, 522b, 522c.

In some examples, to apply the mitigation operation, the base station, at 912, may change one or more communication parameters associated with the UE, as described in connection with 642 of FIG. 6. For example, 912 may be performed by a parameters changing component 1050 of the apparatus 1002 of FIG. 10. The one or more communication parameters may cause the UE to deprioritize cell selection/reselection of the cell operated by the false base station. For example, referring to FIGS. 5 and 6, the network 610 may change one or more communication parameters associated with the UE 504, such as by transmitting new communication parameters to the UE 504 that configure the UE 504 to deprioritize cell selection/reselection of the other cell 562 operated by the FBS 552.

Figure 10:
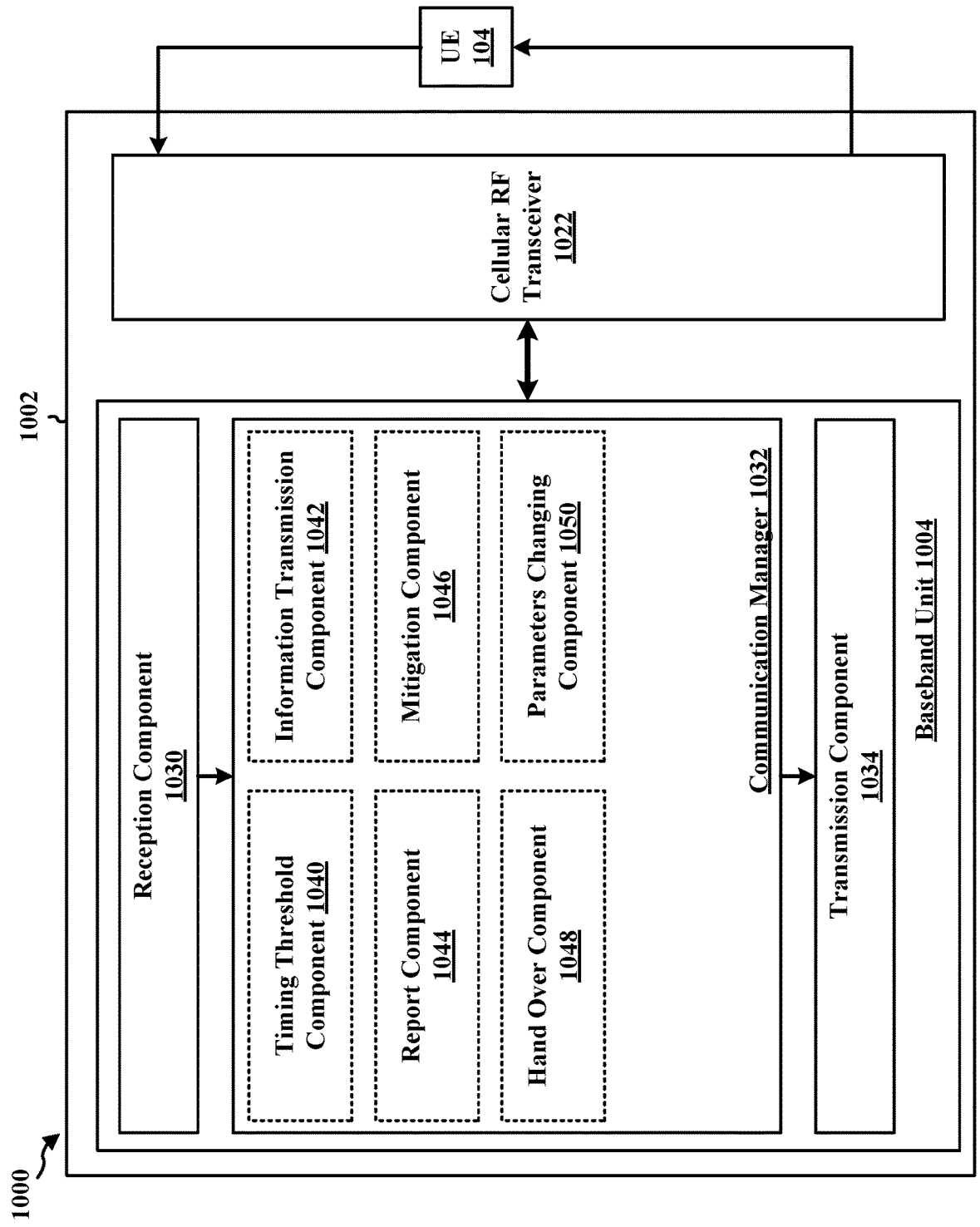
FIG. 10 is a diagram illustrating an example of a hardware implementation for an example apparatus, in accordance with the teachings disclosed herein.

FIG. 10 is a diagram 1000 illustrating an example of a hardware implementation for an apparatus 1002. The apparatus 1002 is a base station and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes a timing threshold component 1040 that is configured to determine a timing threshold associated with detection of a false base station by a UE, e.g., as described in connection with 902 of FIG. 9. The communication manager 1032 further includes an information transmission component 1042 that is configured to transmit the timing threshold to the UE for detection of the false base station by the UE, e.g., as described in connection with 904 of FIG. 9. The communication manager 1032 further includes a report component 1044 that is configured to receive a report of the false base station from the UE based on the timing threshold transmitted to the UE, e.g., as described in connection with 906 of FIG. 9. The communication manager 1032 further includes a mitigation component 1046 that is configured to apply a mitigation operation in response to the report of the false base station, e.g., as described in connection with 908 of FIG. 9. The communication manager 1032 further includes a hand over component 1048 that is configured to hand over the UE to a base station different from that operated by the false base station, e.g., as described in connection with 910 of FIG. 9. The communication manager 1032 further includes a parameters changing component 1050 that is configured to change one or more communication parameters associated with the UE, e.g., as described in connection with 912 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for determining a timing threshold associated with detection of a false base station by a UE, where the timing threshold corresponds to a maximum acceptable difference between a system timing and a time of arrival at which a signal is received from the false base station by the UE. The example apparatus 1002 also includes means for transmitting the timing threshold to the UE for the detection of the false base station by the UE. The example apparatus 1002 also includes means for receiving a report of the false base station from the UE based on the timing threshold transmitted to the UE. The example apparatus 1002 also includes means for applying a mitigation operation in response to the report of the false base station. The example apparatus 1002 also includes means for handing over the UE to a base station different from that operated by the false base station. The example apparatus 1002 also include s means for changing one or more communication parameters associated with the UE, where the communication parameters are to cause the UE to deprioritize cell selection or cell reselection of a cell operated by the false base station.

The aforementioned means may be one or more of the aforementioned components of the apparatus 1002 configured to perform the functions recited by the aforementioned means. As described supra, the apparatus 1002 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

The following aspects are illustrative only and may be combined with other aspects or teachings described herein, without limitation.

Aspect 1 is a method of wireless communication by a UE in a wireless communications network, the method comprising: receiving a signal from each of one or more neighboring base stations, each of the neighboring base stations being associated with a different, unique PCI; determining a system timing associated with the wireless communications network based on a respective time of arrival at which each signal is received from the neighboring base stations; receiving a signal from an FBS associated with a different, unique PCI; and identifying a presence of the FBS based on a difference between the system timing and a time of arrival at which the signal is received from the FBS.

Aspect 2 is the method of aspect 1, further including that the signal received from each of the neighboring base stations and the signal received from the FBS each comprise one of an SS/broadcast channel block or a reference signal.

Aspect 3 is the method of any of aspect 1 or aspect 2, further including: determining the difference between the system timing and the time of arrival at which the signal is received from the FBS, and where the presence of the FBS is identified when the difference satisfies a timing threshold.

Aspect 4 is the method of any of aspects 1 to 3, further including that the timing threshold is received from a legitimate base station via one of an SIB or UE-specific signaling, the legitimate base station comprising a base station belonging to the wireless communications network that the UE is attempting to access for service.

Aspect 5 is the method of any of aspects 1 to 4, further including determining the timing threshold.

Aspect 6 is the method of any of aspects 1 to 5, further including that the timing threshold is based on at least one inter-site distance between at least two neighboring base stations respectively operating the neighboring base stations, the inter-site distance comprising a nominal distance between the at least two neighboring base stations deployed within the wireless communications network.

Aspect 7 is the method of any of aspects 1 to 6, further including that the timing threshold is equal to at least one symbol duration.

Aspect 8 is the method of any of aspects 1 to 7, further including: determining an average timing based on the times of arrival at which the signals are received from each of the neighboring base stations, and where the system timing is determined based on the average timing.

Aspect 9 is the method of any of aspects 1 to 8, further including that the average timing is determined based on weighting powers with which each of the signals is received from the neighboring base stations.

Aspect 10 is the method of any of aspects 1 to 9, further including applying a mitigation operation associated with avoidance of communication with the FBS when the presence of the FBS is identified.

Aspect 11 is the method of any of aspects 1 to 10, further including that the applying the mitigation operation comprises at least one of: reporting the presence of the FBS to a security server of the wireless communications network; or changing one or more communication parameters associated with accessing the wireless communications network.

Aspect 12 is the method of any of aspects 1 to 11, further including that the one or more communication parameters comprises at least one of a base station on which the UE operates, a frequency band in which the UE communicates, or a RAT with which the UE communicates.

Aspect 13 is the method of any of aspects 1 to 12, further including that any two of the times of arrival at which any two signals are received from at least two neighboring base stations are within a timing threshold amount of one another.

Aspect 14 is the method of any of aspects 1 to 13, further including that the timing threshold amount is based on at least one inter-site distance between at least two neighboring base stations respectively operating the neighboring base stations, the inter-site distance comprising a nominal distance between the at least two neighboring base stations deployed within the wireless communications network.

Aspect 15 is an apparatus for wireless communication including at least one processor coupled to a memory and configured to implement a method as in any of aspects 1 to 14.

Aspect 16 is an apparatus for wireless communication including means for implementing a method as in any of aspects 1 to 14.

Aspect 17 is a computer-readable medium storing computer executable code, where the code, when executed, causes a processor to implement a method as in any of aspects 1 to 14.

Aspect 18 is a method of wireless communication by a base station in a wireless communications network, the method comprising: determining a timing threshold associated with detection of a false base station by a UE, and where the timing threshold corresponds to a maximum acceptable difference between a system timing and a time of arrival at which a signal is received from the false base station by the UE; and transmitting the timing threshold to the UE for the detection of the false base station by the UE.

Aspect 19 is the method of aspect 18, further including that the timing threshold is transmitted via one of an SIB or UE-specific signaling.

Aspect 20 is the method of any of aspect 18 or aspect 19, further including that the timing threshold is based on at least one inter-site distance between at least two base stations respectively operating one of a set of base stations neighboring the UE.

Aspect 21 is the method of any of aspects 18 to 20, further including that the timing threshold is equal to at least one symbol duration.

Aspect 22 is the method of any of aspects 18 to 21, further including: receiving a report of the false base station from the UE based on the timing threshold transmitted to the UE; and applying a mitigation operation in response to the report of the false base station.

Aspect 23 is the method of any of aspects 18 to 22, further including that the applying the mitigation operation comprises: handing over the UE to a base station different from that operated by the false base station.

Aspect 24 is the method of any of aspects 18 to 23, further including that the applying the mitigation operation comprises: changing one or more communication parameters associated with the UE, and where the communication parameters are to cause the UE to deprioritize cell selection or cell reselection of a cell operated by the false base station.

Aspect 25 is an apparatus for wireless communication including at least one processor coupled to a memory and configured to implement a method as in any of aspects 18 to 24.

Aspect 26 is an apparatus for wireless communication including means for implementing a method as in any of aspects 18 to 24.

Aspect 27 is a computer-readable medium storing computer executable code, where the code, when executed, causes a processor to implement a method as in any of aspects 18 to 24.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE) in a wireless communications network, the method comprising:
   receiving a signal from each of at least two neighboring base stations, each of the received signals being associated with a different, unique physical cell identity (PCI), wherein each of the received signals comprise a synchronization signal (SS) block, the SS block comprising a primary synchronization signal (PSS) and a secondary synchronization signal (SSS), the PSS located within a first downlink symbol of a subframe and the SSS located within a second downlink symbol of the subframe, the first downlink symbol different from the second downlink symbol;
   receiving a timing threshold from the at least two neighboring base stations, the timing threshold based on at least one inter-site distance between the at least two neighboring base stations;
   determining a system timing associated with the wireless communications network based on a time of arrival at which each signal is received from the at least two neighboring base stations, the system timing comprising a synchronized timing observed across the at least two neighboring base stations, the synchronized timing based on a shared transmission timing of the SS block;
   receiving a signal from an ambiguous cell, the signal from the ambiguous cell being associated with a PCI different than the PCIs associated with the signals received from each of the one or more at least two neighboring base stations; and
   identifying the ambiguous cell as a false base station (FBS) based on a difference between the system timing and a time of arrival at which the signal is received from the ambiguous cell, the identifying comprising comparing the difference to the timing threshold.

2. The method of claim 1, wherein the signal received from each of the at least two neighboring base stations and the signal received from the FBS each comprise one of a synchronization signal (SS)/broadcast channel block or a reference signal.

3. The method of claim 1, further comprising:
   determining the difference between the system timing and the time of arrival at which the signal is received from the FBS,
   wherein the presence of the FBS is identified when the difference satisfies a timing threshold.

4. The method of claim 3, wherein the timing threshold is received from a legitimate base station of the at least two neighboring base stations via one of a system information block (SIB) or UE-specific signaling.

5. The method of claim 3, further comprising determining the timing threshold.

6. The method of claim 3, wherein the inter-site distance comprising a nominal distance between the at least two neighboring base stations deployed within the wireless communications network.

7. The method of claim 3, wherein the timing threshold is equal to at least one symbol duration.

8. The method of claim 1, further comprising:
   determining an average timing based on the times of arrival at which a plurality of signals are received from the at least two neighboring base stations,
   wherein the system timing is determined based on the average timing.

9. The method of claim 8, wherein the average timing is determined based on weighting a value indicative of a power at which each of the signals is received from the at least two neighboring base stations, the value comprising a reference signal received power.

10. The method of claim 1, further comprising applying a mitigation operation associated with avoidance of communication with the FBS when the presence of the FBS is identified.

11. The method of claim 10, wherein the applying the mitigation operation comprises at least one of:
    reporting the presence of the FBS to a security server of the wireless communications network; and
    changing one or more communication parameters associated with accessing the wireless communications network.

12. The method of claim 11, wherein the changing one or more communication parameters comprises changing at least one of a cell of a base station on which the UE operates, a frequency band in which the UE communicates, or a radio access technology (RAT) with which the UE communicates.

13. The method of claim 1, wherein a difference between two of the times of arrival at which any two signals are received from the at least two neighboring base stations are within a timing threshold.

14. An apparatus for wireless in a wireless communications network, the apparatus comprising:
    a memory;
    at least one processor coupled to the memory; and
    instructions stored in the memory and executable by the at least one processor to cause the apparatus to:
       receive a signal from each of at least two neighboring base stations, each of the received signals being associated with a different, unique physical cell identity (PCI) wherein each of the received signals comprise a synchronization signal (SS) block, the SS block comprising a primary synchronization signal (PSS) and a secondary synchronization signal (SSS), the PSS located within a first downlink symbol of a subframe and the SSS located within a second downlink symbol of the subframe, the first downlink symbol different from the second downlink symbol;
       receive a timing threshold from the at least two neighboring base stations, the timing threshold based on at least one inter-site distance between the at least two neighboring base stations;

determine a system timing associated with the wireless communications network based on a respective time of arrival at which each signal is received from the at least two neighboring base stations;

receive a signal from a false base station (FBS), the signal from the FBS being associated with a PCI different than the PCIs associated with the signals received from each of the at least two neighboring base stations; and identify a presence of the FBS based on a difference between the system timing and a time of arrival at which the signal is received from the FBS, the identifying comprising comparing the difference to the timing threshold.

15. The apparatus of claim 14, wherein the at least one processor is further configured to:

determine the difference between the system timing and the time of arrival at which the signal is received from the FBS, wherein the presence of the FBS is identified when the difference satisfies a timing threshold.

16. The apparatus of claim 15, wherein the timing threshold is received from a legitimate base station via one of a system information block (SIB) or UE-specific signaling.

17. The apparatus of claim 15, wherein the at least one processor is further configured to:

determine the timing threshold.

18. The apparatus of claim 14, wherein the at least one processor is further configured to:

determine an average timing based on the times of arrival at which a plurality of signals are received from the at least two neighboring base stations, wherein the system timing is determined based on the average timing.

19. The apparatus of claim 14, wherein the at least one processor is further configured to:

apply a mitigation operation associated with avoidance of communication with the FBS when the presence of the FBS is identified.

20. The apparatus of claim 19, wherein application of the mitigation operation comprises to at least one of:

reporting the presence of the FBS to a security server of the wireless communications network; or changing one or more communication parameters associated with accessing the wireless communications network.

21. The apparatus of claim 14, wherein a difference between two of the times of arrival at which any two signals are received from the at least two neighboring base stations are within a timing threshold.

22. A method of wireless communication by a base station in a wireless communications network, the method comprising:

determining a timing threshold associated with detection of a false base station, wherein the timing threshold corresponds to a maximum difference between a system timing and a time of arrival at which a signal is received from the false base station, the system timing comprising a synchronized timing observed across at least two neighboring base stations, the synchronized timing based on a shared transmission timing of a synchronization signal (SS) block from the at least two neighboring base stations, the SS block comprising a primary synchronization signal (PSS) and a secondary synchronization signal (SSS), the PSS located within a first downlink symbol of a subframe and the SSS located within a second downlink symbol of the subframe, the first downlink symbol different from the second downlink symbol; and transmitting the timing threshold to a user equipment (UE) for the detection of the false base station by the UE.

23. The method of claim 22, wherein the timing threshold is transmitted via one of a system information block (SIB) or UE-specific signaling.

24. The method of claim 22, wherein the timing threshold is equal to at least one symbol duration.

25. The method of claim 22, further comprising:

receiving a report of the false base station from the UE based on the timing threshold transmitted to the UE; and applying a mitigation operation in response to the report of the false base station.

26. The method of claim 25, wherein the applying the mitigation operation comprises:

handing over the UE to a base station different from that operated by the false base station.

27. The method of claim 25, wherein the applying the mitigation operation comprises:

changing one or more communication parameters associated with the UE, wherein the one or more communication parameters are to cause the UE to deprioritize cell selection or cell reselection of a cell operated by the false base station.

28. An apparatus for wireless communication in a wireless communications network, the apparatus comprising:

a memory; and at least one processor coupled to the memory; and instructions stored in the memory and executable by the at least one processor to cause the apparatus to:

determine a timing threshold associated with detection of a false base station wherein the timing threshold corresponds to a maximum difference between a system timing and a timestamp of a time of arrival at which a signal is received from the false base station, the system timing comprising a synchronized timing observed across at least two neighboring base stations, the synchronized timing based on a shared transmission timing of a synchronization signal (SS) block from the at least two neighboring base stations, the SS block comprising a primary synchronization signal (PSS) and a secondary synchronization signal (SSS), the PSS located within a first downlink symbol of a subframe and the SSS located within a second downlink symbol of the subframe, the first downlink symbol different from the second downlink symbol; and transmit the timing threshold to a user equipment (UE) for the detection of the false base station by the UE.

* * * * *